United States Patent
Takehisa et al.

(10) Patent No.: US 12,491,621 B2
(45) Date of Patent: Dec. 9, 2025

(54) ELECTRICAL EQUIPMENT AND ELECTRICAL EQUIPMENT SYSTEM

(71) Applicant: Koki Holdings Co., Ltd., Tokyo (JP)

(72) Inventors: Masashi Takehisa, Ibaraki (JP); Kiyoto Matsuoka, Ibaraki (JP); Tomomasa Nishikawa, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 465 days.

(21) Appl. No.: 18/009,741

(22) PCT Filed: Jul. 9, 2021

(86) PCT No.: PCT/JP2021/025913
§ 371 (c)(1),
(2) Date: Dec. 12, 2022

(87) PCT Pub. No.: WO2022/024715
PCT Pub. Date: Feb. 3, 2022

(65) Prior Publication Data
US 2023/0271310 A1    Aug. 31, 2023

(30) Foreign Application Priority Data
Jul. 31, 2020    (JP) .................. 2020-129941

(51) Int. Cl.
*H02P 6/08*    (2016.01)
*B25F 5/02*    (2006.01)
(Continued)

(52) U.S. Cl.
CPC ............... *B25F 5/029* (2013.01); *H02P 6/08* (2013.01); *H02P 6/20* (2013.01); *H02P 6/24* (2013.01)

(58) Field of Classification Search
CPC .... B25F 5/029; H02P 6/08; H02P 6/20; H02P 6/24
See application file for complete search history.

(56) References Cited

U.S. PATENT DOCUMENTS

2013/0193891 A1* 8/2013 Wood ................. H02P 6/08
318/434
2016/0342151 A1* 11/2016 Dey, IV ............. G06F 3/04817
(Continued)

FOREIGN PATENT DOCUMENTS

| JP | 2008221371 | 9/2008 |
| JP | 2009056555 | 3/2009 |

(Continued)

OTHER PUBLICATIONS

"Notice of Reasons for Refusal of Japan Counterpart Application", issued on Oct. 8, 2024, with English translation thereof, p. 1-p. 10.
(Continued)

Primary Examiner — Nathaniel C Chukwurah
(74) Attorney, Agent, or Firm — JCIPRNET

(57) ABSTRACT

An electrical equipment system includes electrical equipment, a battery pack with a wireless communication function which is mounted to the electrical equipment, and a portable terminal wirelessly communicable with the battery pack. The electrical equipment includes a drive part, a control part which controls the drive part, an operation part which instructs start and stop of the drive part, and a storage part which stores operation parameters for driving the drive part. Various operation parameters, such as an operation amount of the operation part for starting the drive part of the electrical equipment, are configured to be changeable by a management application installed in the portable terminal.

19 Claims, 29 Drawing Sheets

Example of changing amount of play, minimum rotational speed, and transmission characteristics

(51) Int. Cl.
    *H02P 6/20*    (2016.01)
    *H02P 6/24*    (2006.01)

(56) References Cited

U.S. PATENT DOCUMENTS

| | | | |
|---|---|---|---|
| 2017/0173768 A1* | 6/2017 | Dey, IV | B25F 5/00 |
| 2019/0043292 A1* | 2/2019 | Hoossainy | B25F 5/00 |
| 2019/0111550 A1* | 4/2019 | Kato | B25F 5/00 |
| 2019/0111551 A1* | 4/2019 | Kato | B25B 21/02 |
| 2019/0227528 A1* | 7/2019 | Abbott | G05B 13/027 |
| 2020/0042753 A1* | 2/2020 | Huggins | G06K 7/10297 |
| 2020/0376645 A1* | 12/2020 | Davis | B25F 5/02 |

FOREIGN PATENT DOCUMENTS

| | | |
|---|---|---|
| JP | 2012139801 | 7/2012 |
| JP | 2013000874 | 1/2013 |
| JP | 2013255962 | 12/2013 |
| JP | 2014018868 | 2/2014 |
| JP | 2017087412 | 5/2017 |
| JP | 2017136667 | 8/2017 |
| JP | 2019072811 | 5/2019 |
| JP | 2019072812 | 5/2019 |

OTHER PUBLICATIONS

"International Search Report (Form PCT/ISA/210) of PCT/JP2021/025913", mailed on Sep. 14, 2021, with English translation thereof, pp. 1-6.

* cited by examiner

Example of changing amount of play and transmission characteristics

Example of changing amount of play, minimum rotational speed, and transmission characteristics Example of changing maximum rotational speed trigger position Example of changing maximum rotational speed Example of changing maximum rotational speed trigger position and maximum rotational speed Example of changing maximum rotational speed trigger position and transmission characteristics Example of changing maximum rotational speed trigger position, maximum rotational speed, and transmission characteristics Example of changing transmission characteristics Relationship between trigger signal and rotational speed Relationship between trigger signal and rotational speed

ELECTRICAL EQUIPMENT AND ELECTRICAL EQUIPMENT SYSTEM

CROSS-REFERENCE TO RELATED APPLICATION

This application is a 371 application of the International PCT application serial no. PCT/JP2021/025913, filed on Jul. 9, 2021, which claims the priority benefits of Japan Patent Application No. 2020-129941, filed on Jul. 31, 2020. The entirety of each of the above-mentioned patent applications is hereby incorporated by reference herein and made a part of this specification.

TECHNICAL FIELD

The present invention relates to electrical equipment such as a power tool, and an electrical equipment system including the electrical equipment.

RELATED ART

Even in a case of using the same type of electrical equipment, the usage thereof differs depending on the user or the work content, so there is a demand for electrical equipment capable of performing optimum work that matches the user or the work content. Patent Document 1 listed below describes that by making it possible to change setting parameters of a power tool from a portable device via wireless communication, setting parameters optimum for the work can be selected.

RELATED ART DOCUMENTS

Patent Documents

Patent Document 1: Japanese Patent Application Laid-Open No. 2014-018868

SUMMARY OF INVENTION

Problems to be Solved by Invention

A first issue is that it is desired to be able to set operation parameters according to the user or the work content.

Further, a second issue is that since a position at which it is easy to operate an operation part differs depending on the size of the user's hand, it is desired to be able to set a suitable state (condition) for each user.

An objective of the present invention is to solve at least one of the first issue and the second issue described above. That is, an objective of the present invention is to provide electrical equipment and an electrical equipment system capable of setting optimum or more appropriate operation parameters that match a user or a work content, and/or, to providing electrical equipment and an electrical equipment system capable of setting optimum or more appropriate operation parameters for a user while making it possible to set an operation amount (so-called amount of play) of the operation part for starting a motor to a position suitable for the user.

Means for Solving Problems

A first aspect of the present invention is electrical equipment. The electrical equipment includes: a drive part; a control part which controls the drive part; an operation part which instructs start and stop of the drive part; and a storage part which stores operation parameters for driving the drive part. The operation parameters include: an operation amount of the operation part for starting the drive part; and a set rotational speed of the drive part corresponding to an operation of the operation part after the drive part has started or a minimum rotational speed of the drive part. The operation amount and the set rotational speed or the minimum rotational speed are configured to be changeable. A pull amount of the operation part until the drive part reaches a maximum rotational speed is configured not to be changed even if the operation amount is changed.

All of the operation amount, the set rotational speed, and the minimum rotational speed may be configured to be changeable.

A second aspect of the present invention is electrical equipment. The electrical equipment includes: a drive part; a control part which controls the drive part; an operation part which instructs start and stop of the drive part; and a storage part which stores operation parameters for driving the drive part. The operation parameters include: an operation amount of the operation part at which the drive part becomes a maximum rotational speed; and a set rotational speed of the drive part corresponding to an operation of the operation part after the drive part has started. The operation amount and the set rotational speed are configured to be changeable. A pull amount of the operation part until the drive part reaches the maximum rotational speed is configured not to be changed even if the operation amount is changed. Further, an acceleration characteristic from when the operation part exceeds the operation amount until the drive part reaches the maximum rotational speed may be configured to be automatically changed.

A third aspect of the present invention is electrical equipment. The electrical equipment includes: a drive part; a control part which controls the drive part; an operation part which instructs start and stop of the drive part; and a storage part which stores operation parameters for driving the drive part. The operation parameters include: a set rotational speed of the drive part corresponding to an operation of the operation part after the drive part has started; and a time taken for the drive part to reach a maximum rotation speed when an operation amount of the operation part is at a maximum. The set rotational speed and the time are configured to be changeable.

The operation parameters may include at least one of: an operation amount of the operation part for starting the drive part; a set rotational speed of the drive part corresponding to an operation of the operation part after the drive part has started; a minimum rotational speed of the drive part; a maximum rotational speed of the drive part; an operation amount of the operation part at which the drive part becomes the maximum rotational speed; and a time taken for the drive part to reach the maximum rotational speed when an operation amount of the operation part is at a maximum. At least one of the operation parameters may be configured to be changeable.

A fourth aspect of the present invention is an electrical equipment system. The electrical equipment system includes: the electrical equipment described above; and an external device communicable with the electrical equipment. The operation parameters are configured to be changeable by the external device. The electrical equipment includes an equipment-side communication part for communicating with the external device. The external device includes: an input part which inputs the operation parameters; a display part which displays the operation parameters; and an external device-side communication part for communicating with the equipment-side communication part.

The display part may be capable of displaying an image showing the electrical equipment. The image may be changeable.

The electrical equipment may include: a battery pack which serves as a power source of the drive part; and an electrical equipment main body which has a connection part to which the battery pack is connected. The display part may be capable of displaying a connection status between the battery pack and the electrical equipment main body.

The battery pack may include the equipment-side communication part. The electrical equipment main body may include the storage part. The operation parameters may be stored in the storage part via the equipment-side communication part.

The operation parameters may include a first initial parameter and a second initial parameter. The first initial parameter and the second initial parameter may be capable of being selected and used.

The input part may be capable of inputting a name of a target material to be worked on. The display part may be capable of displaying the inputted name of the target material.

The operation parameters may be capable of being uploaded from the external device to a network, and further another external device may be capable of downloading the operation parameters from the network.

Setting completion after changing the operation parameters may be displayed as a change in a color or blinking of an equipment-side display part.

Any combination of the above constituent elements and conversion of expressions of the present invention between methods and systems are also effective as embodiments of the present invention.

Effect of Invention

According to the electrical equipment and the electrical equipment system according to the present invention, it is possible to set optimum or more appropriate operation parameters of the drive part that match the user or the work content. Further, in the case of selecting an operation amount (so-called amount of play) of the operation part for starting the drive part as the operation parameter, while the amount of play can be set to a position suitable for a user, other operation parameters can be set optimally or more appropriately for the user. Therefore, it is possible to set optimum or more appropriate operation parameters with respect to electrical equipment that are easy to use for more users than before.

DESCRIPTION OF EMBODIMENTS

Hereinafter, the same or equivalent constituent elements, members, etc. shown in each drawing will be labeled with the same reference signs, and repeated descriptions will be omitted as appropriate. The embodiments are illustrative rather than limiting of the invention. All features and combinations thereof described in the embodiments are not necessarily essential to the invention.

Figure 1:
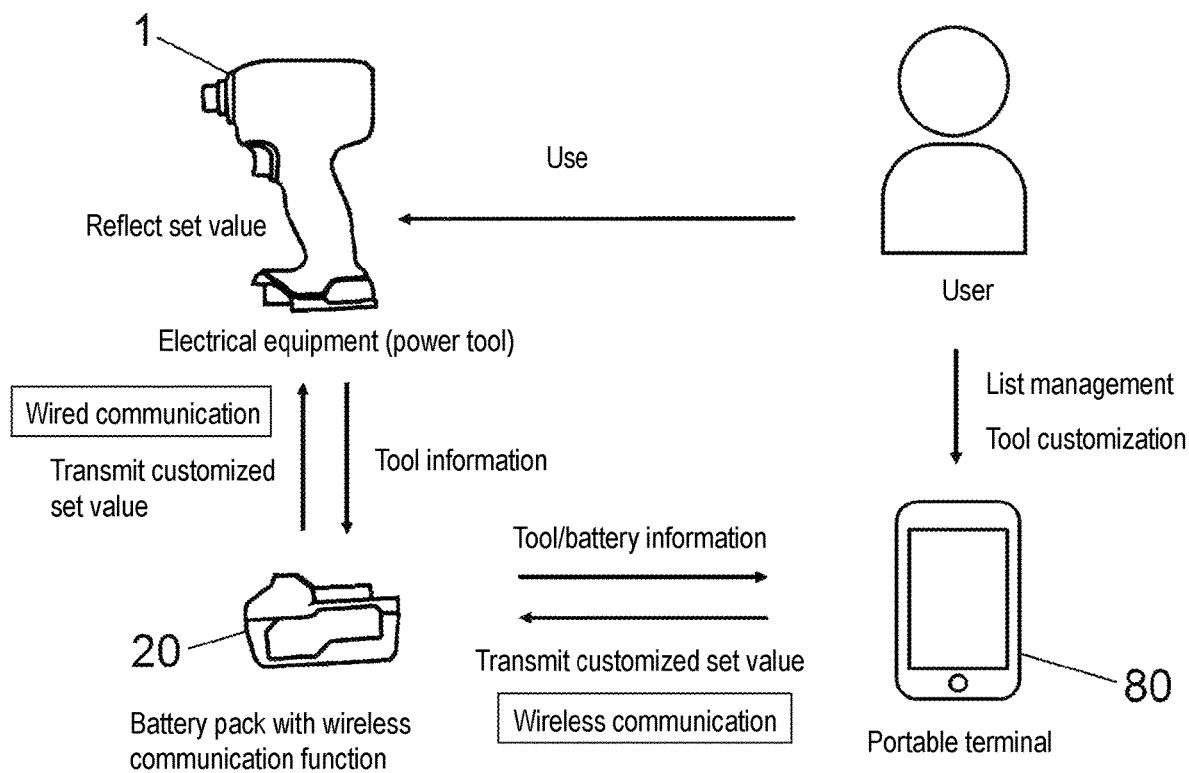
FIG. 1 is a schematic view showing electrical equipment and an electrical equipment system according to an embodiment of the present invention.

FIG. 1 is a schematic view showing electrical equipment and an electrical equipment system according to an embodiment of the present invention. As shown in this figure, a portable terminal 80 serving as an external device having a wireless communication function such as a smartphone of a user and a battery pack 20 with a wireless communication function may be connected to each other by wireless communication, and electrical equipment (electrical equipment main body, power tool main body) 1 and the mounted battery pack 20 are connected to each other by wired communication.

Customized set values are transmitted from the portable terminal 80 to the battery pack 20, and tool/battery information is transmitted from the battery pack 20 to the portable terminal 80. The customized set values are transmitted (transferred) from the battery pack 20 to the electrical equipment 1. Tool information is transmitted from the electrical equipment 1 to the battery pack 20. The user uses the portable terminal 80 to perform registration list management and tool customization of the electrical equipment 1 and the battery pack 20. Details will be described later.

Figure 2:
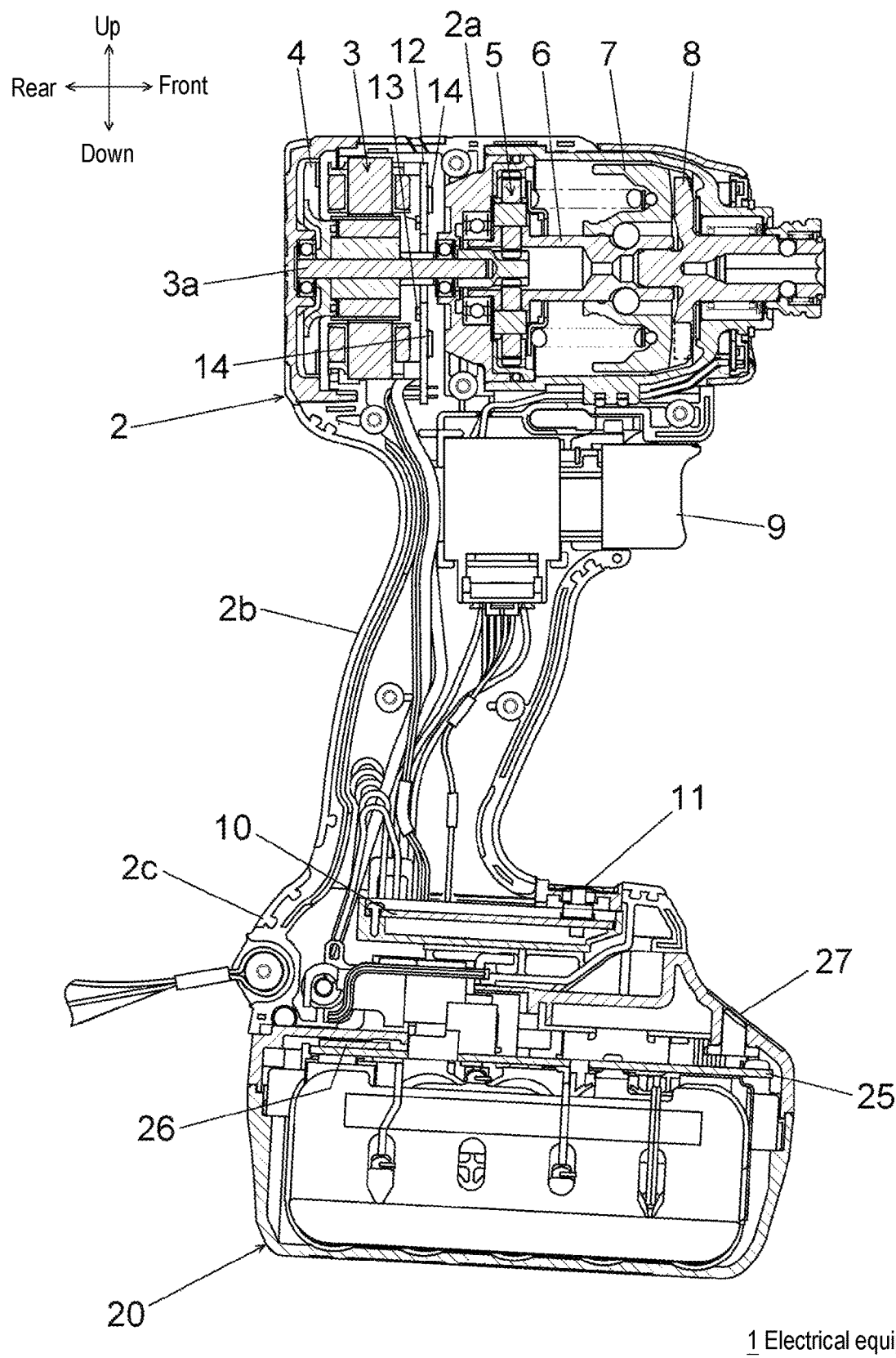
FIG. 2 is a side sectional view of electrical equipment 1 according to the embodiment.

FIG. 2 is a side sectional view of the electrical equipment 1 to which the battery pack 20 is connected. With reference to FIG. 2, the front, rear, up, and down directions that are orthogonal to each other in the electrical equipment 1 are defined. The front-rear direction is a direction parallel to a central axis of an output shaft 3a of a motor 3 serving as a drive part. The electrical equipment 1 is a power tool, and specifically, a cordless impact driver. The electrical equipment 1 includes a housing 2. The housing 2 includes a body part (cylindrical part) 2a, a handle part 2b, and a battery pack mounting part 2c. The body part 2a of the housing 2 has a cylindrical shape, and its central axis is parallel to the front-rear direction. The handle part 2b extends downward from an intermediate part of the body part 2a. The battery pack mounting part 2c is provided at a lower end part of the handle part 2b.

A fan 4, a stator and a rotor of the motor 3 serving as the drive part, a sensor/inverter circuit board 12, a planetary gear mechanism (reduction mechanism) 5, a spindle 6, a hammer 7, and an anvil 8 are provided in the body part 2a sequentially from the rear side. The fan 4 is directly connected to the output shaft 3a of the motor 3 serving as the drive part and rotates together with the motor 3 to generate cooling air within the housing 2. Herein, the motor 3 is an inner rotor-type brushless motor. The sensor/inverter circuit board 12 is accommodated in the body part 2a to be perpendicular to the front-rear direction. Specifically, it is supported (fixed) by an insulator attached to the stator of the motor 3. The sensor/inverter circuit board 12 includes a magnetic sensor 13 such as a Hall IC mounted on its back surface, and a plurality of switching elements 14 mounted on its front surface. The magnetic sensor 13 serves to detect a rotational position of the motor 3. The switching element 14 serves to supply a current to the motor 3. The plurality of switching elements 14 correspond to switching elements Q1 to Q6 in FIG. 6. The output shaft 3a of the motor 3 penetrates the sensor/inverter circuit board 12 and extends toward the front side. The planetary gear mechanism 5 decelerates the rotation of the motor 3 and transmits the rotation to the spindle 6. The hammer 7 rotates together with the spindle 6, and rotates or rotates/impacts the anvil 8. A tip tool such as a bit (not shown) is attached to the anvil 8. The spindle 6, the hammer 7, and the anvil 8 are examples of driven parts and constitute a conventionally known rotary impact mechanism (impact mechanism).

Figure 3:
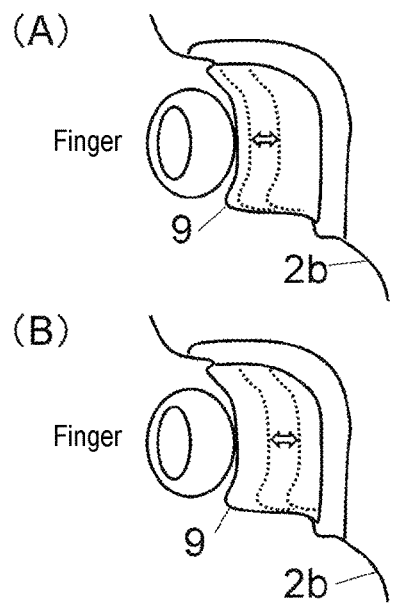
FIG. 3 is a view illustrating a trigger switch of the electrical equipment 1 and its peripheral portion, (A) of FIG. 3 shows, by an arrow, a range of a trigger pull amount in which a rotational speed may be controlled when an amount of play of the trigger switch 9 is small, and (B) of FIG. 3 shows, by an arrow, a range of the trigger pull amount in which the rotational speed may be controlled when the amount of play is large.

The handle part 2b is a portion that is gripped by an operator, and a trigger switch 9 shown in enlarged views in (A) and (B) of FIG. 3 is provided at an upper front part of the handle part 2b. The trigger switch 9 is an operation part for switching driving and stopping of the motor 3 by the operator. (A) of FIG. 3 shows, by an arrow, a range of a trigger pull amount in which a rotational speed may be controlled when an amount of play of the trigger switch 9 is small, and (B) of FIG. 3 shows, by an arrow, a range of the trigger pull amount in which the rotational speed may be controlled when the amount of play is large.

Figure 4:
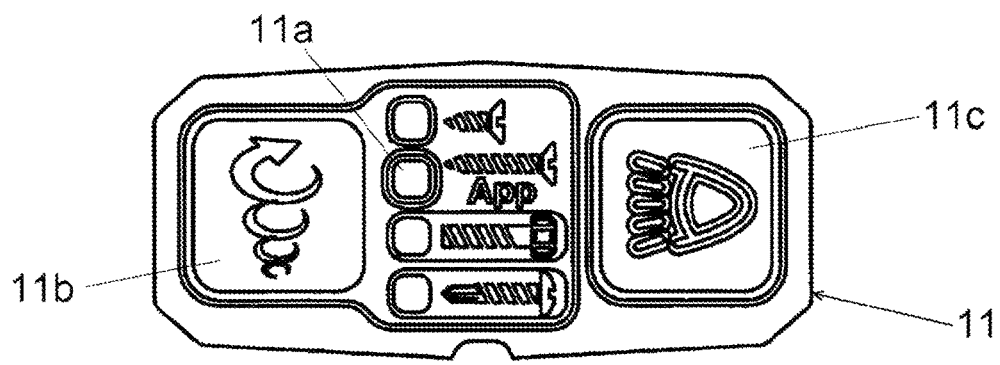
FIG. 4 is a plan view showing a mode switching part 11 of the electrical equipment 1.

An electrical equipment control board 10 is provided at an upper part in the battery pack mounting part 2c. The electrical equipment control board 10 is accommodated in a board case and coated with resin, and the board case is supported by the battery pack mounting part 2c. The electrical equipment control board 10 is provided with an arithmetic part 40 and the like shown in FIG. 6. The arithmetic part 40 includes a microcomputer and the like and functions as a control part. A mode switching part 11 serving as an equipment-side display part of FIG. 4 is provided on an upper surface of the battery pack mounting part 2c. The mode switching part 11 includes an operation part 11b for switching an operation mode of the electrical equipment 1 among, for example, strong (high speed), medium (medium speed), and weak (low speed) modes, or switching among a soft mode (weak) which drives at low speed, a power mode (strong) which drives at high speed, a bolt mode used for bolt tightening, a bolt single shot mode which stops the motor 3 after hitting once in the bolt mode, and a tex mode which reduces the rotational speed of the motor 3 when a screw is seated. The mode switching part 11 also includes a display part (four LEDs arranged vertically at the central part of FIG. 4) which displays a current mode switched by the operation part 11b, and a light button 11c which switches on and off a light illuminating the periphery of the tip tool. The display part has four LEDs, and each time the operation part 11b is pressed, the position that lights up is changed. In the display part, the top LED lights up when the soft mode is selected, the second LED from the top lights up when the power mode is selected, the third LED from the top lights up when the bolt mode and the bolt single shot mode are selected, and the bottom LED lights up when the tex mode is selected; the third LED from the top lights up when the bolt mode is selected, and blinks when the bolt single shot mode is selected. Further, the second LED from the top is configured to also serve as an App display part 11a which displays a setting state of operation parameters to correspond to a management application (to be described later).

Herein, the portion of the electrical equipment 1 excluding the battery pack 20 is defined as a main body (electrical equipment main body) of the electrical equipment 1. The main body of the electrical equipment 1 includes the battery pack mounting part 2c serving as a connection part to which the battery pack 20 serving as a power source of the motor 3 is connected. However, as shown in FIG. 1 and FIG. 6 (to be described later), the main body (electrical equipment main body) of the electrical equipment 1 may be simply referred to as the electrical equipment 1 in some cases.

Figure 5:
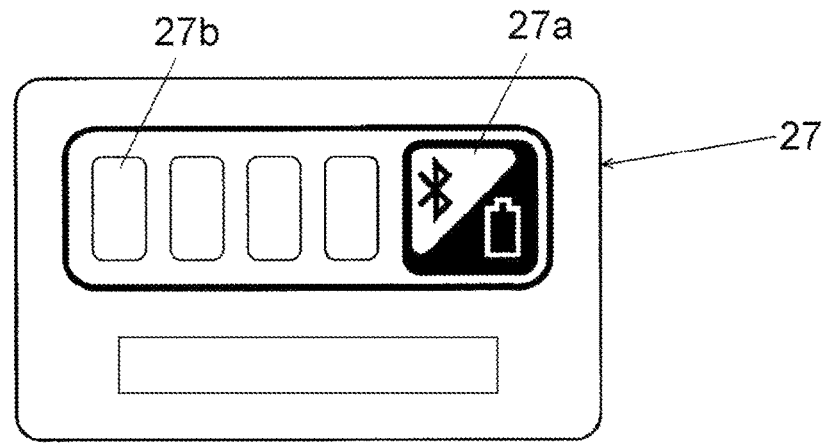
FIG. 5 is a plan view showing a panel part 27 of the battery pack 20 with a wireless communication function according to the embodiment.

The battery pack 20 is connected to the battery pack mounting part 2c. The battery pack 20 accommodates battery cells and also accommodates a battery control board 25. The battery control board 25 is mounted with a communication part (battery communication part) 26 for short-range wireless communication. The communication part 26 is, for example, a BLE (Bluetooth low energy) module. A panel part 27 is provided on an outer surface of the battery pack 20. As shown in FIG. 5, the panel part 27 is provided with an operation button 27a for displaying a remaining level of the battery pack 20 and switching on/off the short-range wireless communication function. When the operation button 27a is short-pressed, LEDs serving as a display part on the left side light up according to the battery level, and the state can be visually recognized through windows 27b. As the battery level is higher, the number of lit LEDs (LEDs visible from the windows 27b) becomes larger. When the operation button 27a is long-pressed, the LED provided at a position corresponding to the right-end window 27b blinks. The battery pack 20 is connected to an external device such as the portable terminal 80, and when the connection is completed, the LED provided at the position corresponding to the right-end window 27b lights up. Two types (e.g., green and blue) of LEDs of different colors are provided at the position corresponding to the right-end window 27b, with one being for remaining level display and the other being for wireless communication. One type (e.g., green) of LEDs is provided at positions corresponding to the windows 27b from the left-end window 27b to the third window 27b from the left end. When the operation button 27a is short-pressed, the four green LEDs light up according to the battery level. When the operation button 27a is long-pressed, the right-end blue LED blinks. Each of the LEDs is mounted on the battery control board 25.

Figure 6:
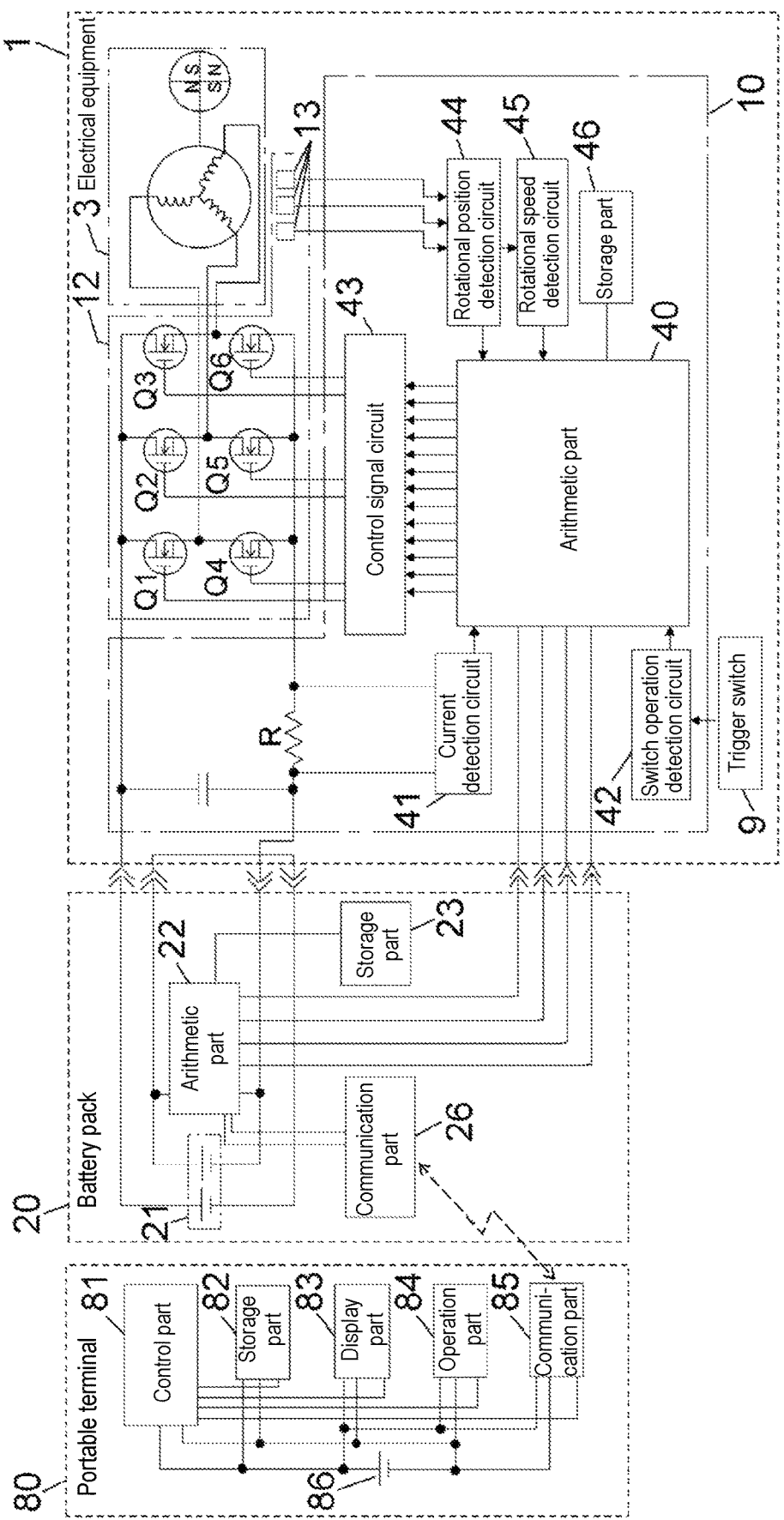
FIG. 6 is a circuit diagram of an electrical equipment system including the electrical equipment 1 (electrical equipment main body), the battery pack 20, and a portable terminal 80.

FIG. 6 is a circuit diagram of an electrical equipment system including the electrical equipment 1 (electrical equipment main body) to which the battery pack 20 is mounted and the portable terminal 80. In this figure, the battery pack 20 includes a battery cell set 21, an arithmetic part 22 serving as a battery control part, a storage part 23 serving as a battery storage part, and a communication part 26 serving as a battery communication part. The battery cell set 21 is composed of a plurality of battery cells such as lithium ion secondary battery cells. The number of series connections and the number of parallel connections of the plurality of battery cells are arbitrary. The arithmetic part 22 includes a microcontroller (microcomputer) or the like, communicates (wired communication) with an arithmetic part 40 serving as an equipment control part of the electrical equipment 1, and controls the communication part 26. The storage part 23 stores specific information of the battery pack 20, such as the model name and the serial number. The communication part 26 communicates (wireless communication) with a communication part 85 of the portable terminal 80. The arithmetic part 22 and the storage part 23 are also mounted on the battery control board 25. The storage part 23 may be separate from the arithmetic part 22 or may be built in the arithmetic part 22.

The portable terminal 80 includes a control part 81 serving as a terminal control part, a storage part 82 serving as a terminal storage part, a display part 83, an operation part 84 functioning as an input part, a communication part 85 serving as a terminal communication part, and a battery 86. If the portable terminal 80 is a smartphone or a tablet terminal, the screen of the smartphone or the tablet terminal serves as the display part 83 as well as the operation part 84. The communication part 85 has a short-range wireless communication function such as Bluetooth (registered trademark), and communicates with the communication part 26 of the battery pack 20. A management application is installed in the storage part 82. The control part 81 executes each function of the management application. The management application enables the display part 83 to display operation parameters and the like of the electrical equipment 1 as will be described later.

In the electrical equipment 1, the switching elements Q1 to Q6 provided on the sensor/inverter circuit board 12 are three-phase bridge-connected to form an inverter circuit. The switching elements Q1 to Q6 perform a switching operation under the control of the arithmetic part 40 to supply driving power to the motor 3. The magnetic sensor 13 provided on the sensor/inverter circuit board 12 transmits an electrical signal corresponding to the rotational position of the motor 3 to a rotational position detection circuit 44. The electrical equipment control board 10 is provided with an arithmetic part 40 serving as an electrical equipment control part, a current detection circuit 41, a switch operation detection circuit 42, a control signal circuit (control signal output circuit) 43, a rotational position detection circuit 44, a rotational speed detection circuit 45, and a storage part (electrical equipment storage part) 46.

The current detection circuit 41 detects a current of the motor 3 according to a voltage of a resistor R provided in a current path of the motor 3 and outputs to the arithmetic part 40. The switch operation detection circuit 42 detects an operation of the trigger switch 9 and outputs to the arithmetic part 40. The control signal circuit 43 applies a control signal (e.g., a PWM signal) to each control terminal of the switching elements Q1 to Q6 under the control of the arithmetic part 40. The rotational position detection circuit 44 detects a rotational position of the motor 3 based on a signal from the magnetic sensor 13 and outputs to the arithmetic part 40. The rotational speed detection circuit 45 detects a rotational speed of the motor 3 based on a signal from the rotational position detection circuit 44 and outputs to the arithmetic part 40. The storage part 46 stores specific information of the electrical equipment 1, usage history information of the electrical equipment 1, operation parameters for driving the motor 3, etc. The operation parameters include those added and edited by the management application of the portable terminal 80. The storage part 46 may be separate from the arithmetic part 40 or may be built in the arithmetic part 40. The storage part 46 is composed of a non-volatile memory that can retain stored information even when power is not supplied. According to the operation of the trigger switch 9, the rotational position and the rotational speed of the motor 3, and the current of the motor 3, the arithmetic part controls (e.g., PWM control) turn-on/off of the switching elements Q1 to Q6 via the control signal circuit 43 to control the drive of the motor 3.

Figure 7:
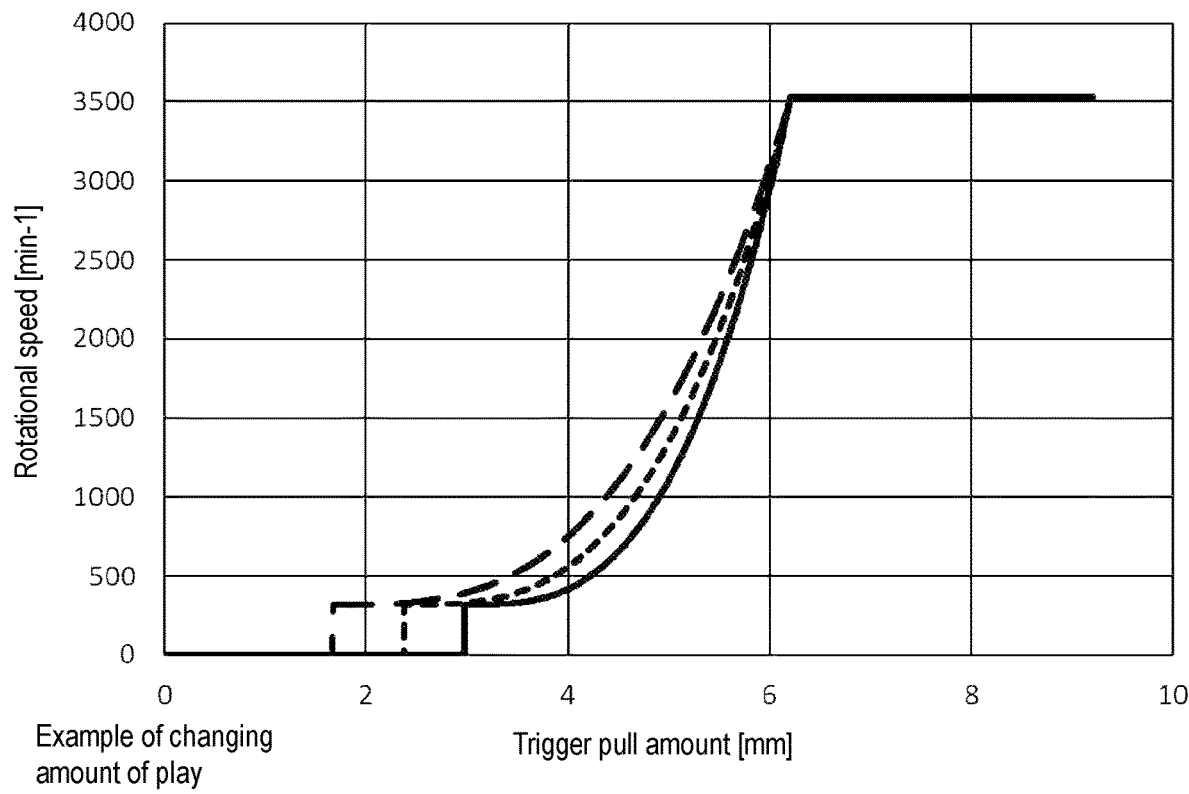
FIG. 7 is a graph showing a relationship between a trigger pull amount in the electrical equipment 1 and a rotational speed of the electrical equipment 1, and showing an example of changing an amount of play.

FIG. 7 is a graph showing a relationship between a trigger pull amount [mm] (operation amount of the operation part) and a rotational speed [min−1] of the electrical equipment 1 with respect to the trigger switch 9 serving as the operation part in the electrical equipment 1, and showing an example of changing an amount of play. In the case where the electrical equipment 1 has the structure of the impact driver shown in FIG. 2, the rotational speed is a rotational speed of the anvil 8 (a rotational speed proportional to the rotational speed of the motor 3) holding the tip tool under no load (same below). In the illustrated case, the amount of play of the trigger may be adjusted within a range from less than 2 mm to about 3 mm of the trigger pull amount. When the trigger pull amount exceeds the set amount of play of the trigger, the motor 3 (anvil 8) starts rotating. Afterwards, after starting rotation at a minimum rotational speed, the rotational speed increases as the trigger pull amount increases. When reaching an upper limit value (maximum rotational speed pull amount) of the trigger pull amount in which the rotational speed may be controlled, the maximum rotational speed is reached and the rotational speed is maintained thereafter. At this time, as is clear from FIG. 7, regardless of the change in the set value of the amount of play of the trigger, the maximum rotational speed and the trigger pull amount (maximum operation amount) until reaching the maximum rotational speed are constant (do not change). Therefore, the acceleration characteristics (a curve of the rotational speed corresponding to the trigger pull amount, also referred to as transmission characteristics) from when the set amount of play of the trigger is exceeded until the maximum rotational speed is reached are different. That is, when the set value of the amount of play of the trigger is changed, the acceleration characteristics until reaching the maximum rotational speed automatically change (are changed). Accordingly, it is possible to prevent failing to reach the maximum rotational speed when the trigger operation amount reaches its maximum. In addition, if the trigger pull amount until reaching the maximum rotational speed is changed according to the amount of play of the trigger, namely, if the acceleration characteristics are not changed but are only shifted according to the amount of play of the trigger (the curve of the rotational speed corresponding to the trigger pull amount is the same), the maximum rotational speed may not be reached when the trigger operation amount is at its maximum.

Further, since a starting position (so-called amount of play) of the motor according to the trigger switch 9 can be changed according to the size of the user's hand or preference, the user can use the equipment easily and workability is improved. For example, if the user's hand is small, the amount of play is increased, and if the user's hand is large, the amount of play is decreased, so that the operational feeling can be improved (unified).

Figure 8:
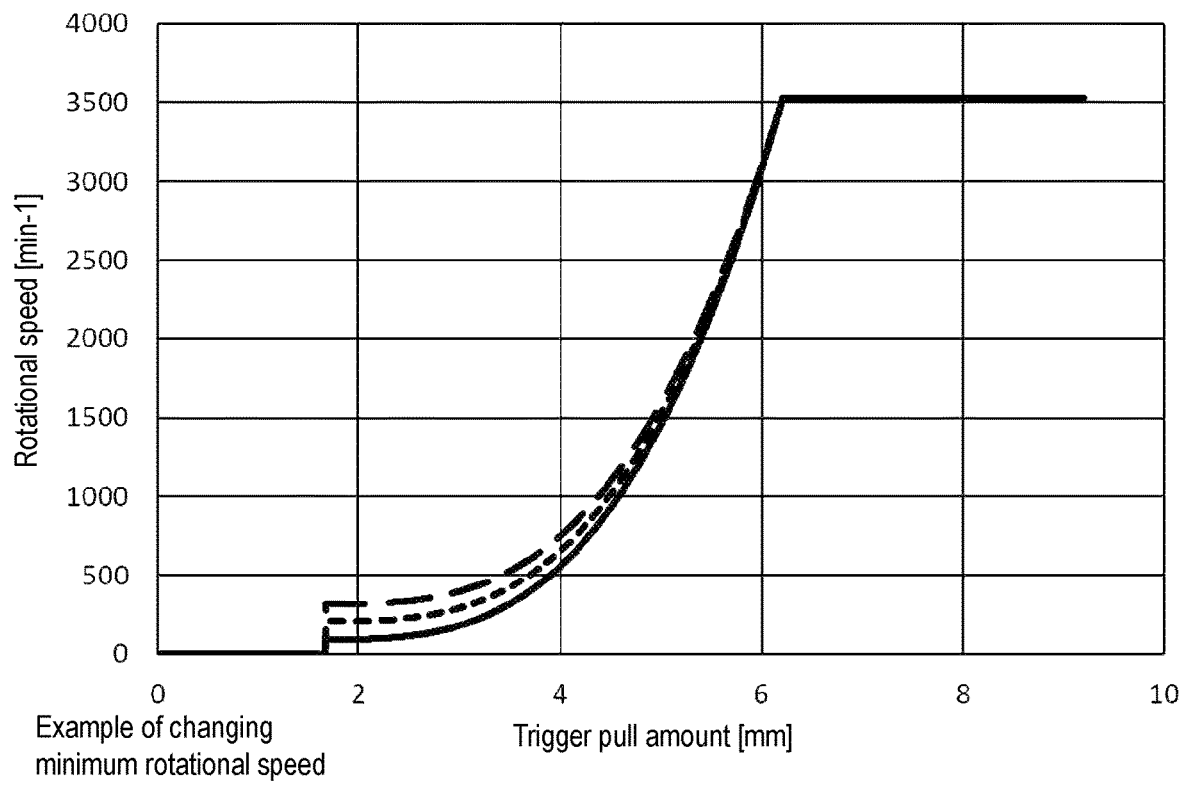
FIG. 8 is a graph also showing a relationship between the trigger pull amount and the rotational speed of the electrical equipment 1, and showing an example of changing the minimum rotational speed.

FIG. 8 is a graph also showing a relationship between the trigger pull amount and the rotational speed of the electrical equipment 1, and showing an example of changing the minimum rotational speed. In this case, the minimum rotational speed at the start of rotation may be changed within a range of less than 500 rotations per minute.

Since the minimum rotational speed may be changed, it can be set according to the type of screws used, so workability is improved. For example, it is possible to perform stripped screw prevention and screw tapping settings. A low minimum rotational speed is suitable for delicate works that require low speed, such as tightening short screws. At this time, as is clear from FIG. 8, regardless of the change in the set value of the minimum rotational speed, the maximum rotational speed is reached with the same trigger pull amount. Therefore, the acceleration characteristics (transmission characteristics) from the set minimum rotational speed to the maximum rotational speed are automatically changed.

Figure 9:
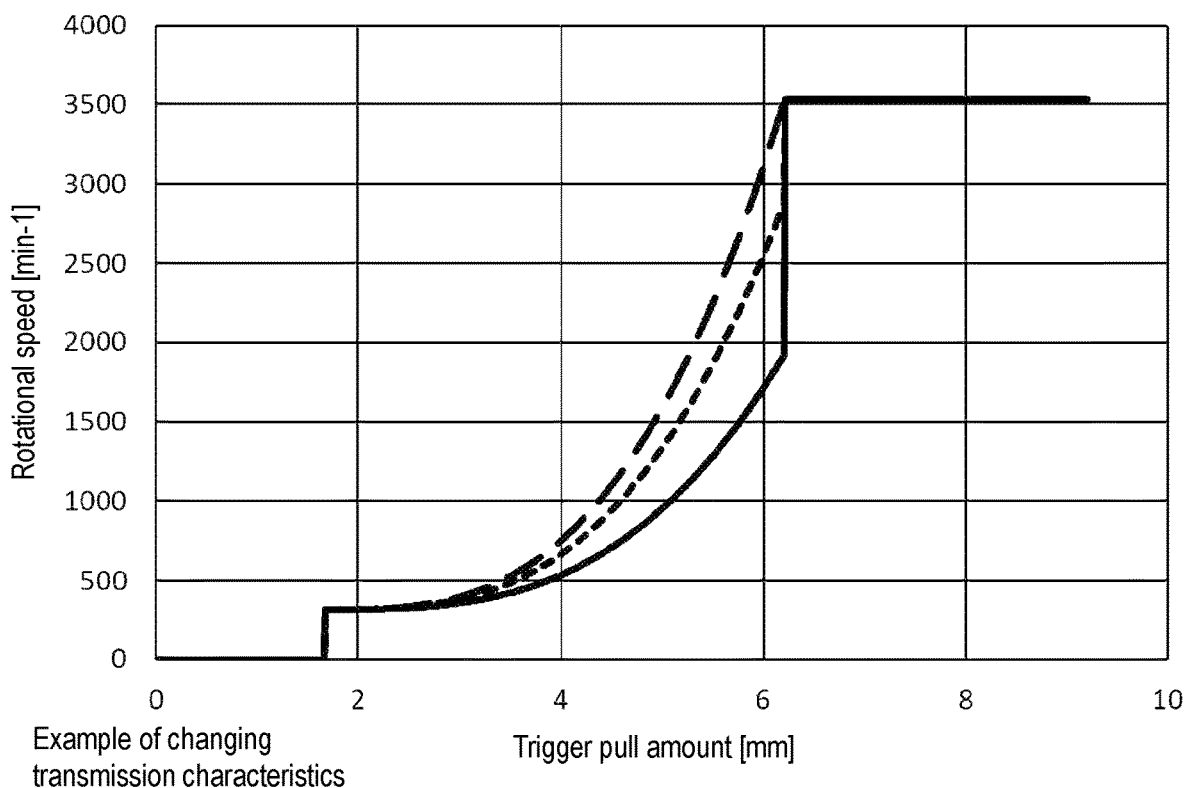
FIG. 9 is a graph also showing a relationship between the trigger pull amount and the rotational speed of the electrical equipment 1, and showing an example of changing the transmission characteristics.

FIG. 9 is a graph also showing a relationship between the trigger pull amount and the rotational speed of the electrical equipment 1, and showing an example of changing the transmission characteristics. In this case, the minimum rotational speed and the maximum rotational speed are constant, but the degree of rotational speed change between them may be set to be different. That is, it is possible to change the set rotational speed of the motor corresponding to the trigger operation after the motor has started.

Further, by combining with a soft start function that slows down the over-time change of the rotational speed, if one wants to make an adjustment to change to full speed after tapping a screw at low-to-medium speed, with a machine screw, screw entry may be checked at ultra-low speed, and the lead of the screw may be suddenly run at full speed (small soft start function). Further, with a wood screw, it is possible to take on transmission characteristics that make it easy to adjust to medium speed, which is easy for screw entry to some extent, and after the screw has been tapped, increase rotation gradually and hit so that cam-out does not occur (large soft start function).

Figure 10:
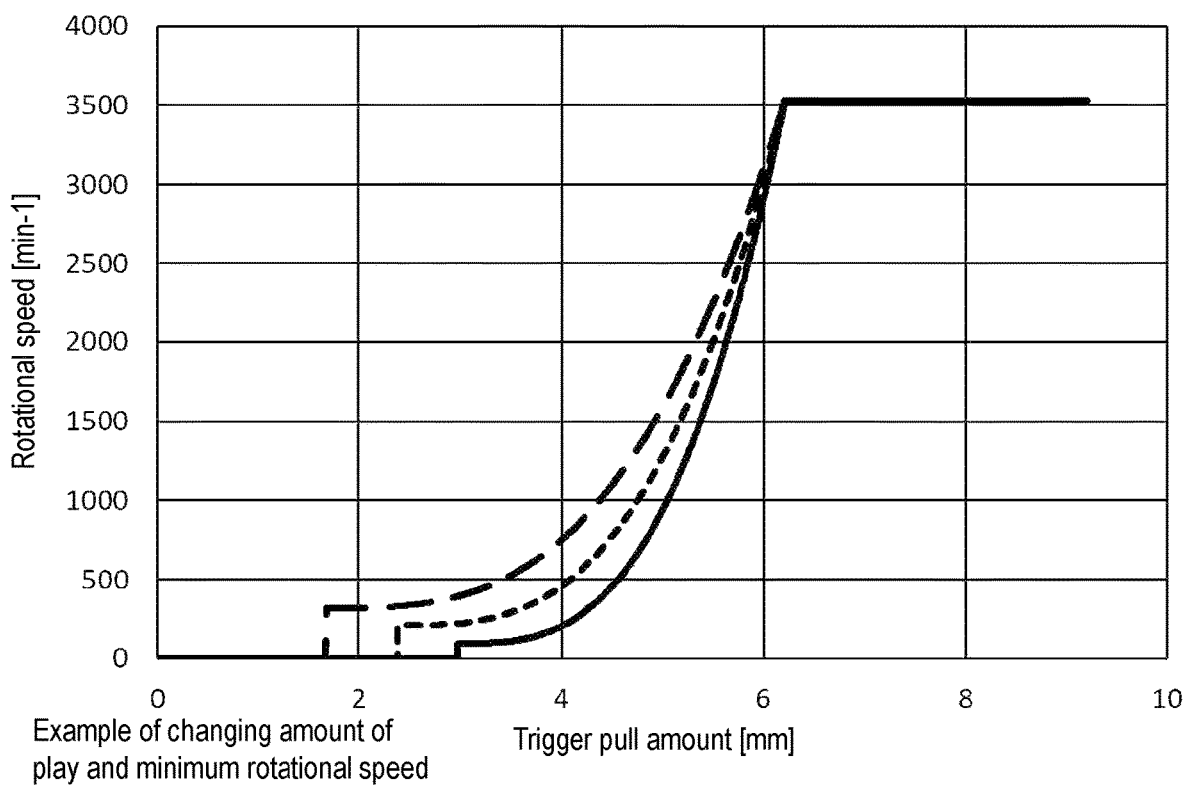
FIG. 10 is a graph also showing a relationship between the trigger pull amount and the rotational speed of the electrical equipment 1, and showing an example of changing the amount of play and the minimum rotational speed.

FIG. 10 is a graph also showing a relationship between the trigger pull amount and the rotational speed of the electrical equipment 1, and showing an example of changing the amount of play and the minimum rotational speed. In this case, the maximum rotational speed is constant, but the amount of play and the minimum rotational speed may be set to be different. At this time, as is clear from FIG. 10, regardless of the changes in the set values of the amount of play of the trigger and the minimum rotational speed, the maximum rotational speed is reached with the same trigger pull amount. Therefore, the acceleration characteristics (transmission characteristics) from the set minimum rotational speed (exceeding the amount of play of the trigger) until reaching the maximum rotational speed are automatically changed.

As an advantage of changing the minimum rotational speed, it is possible to select an ultra-slow rotational speed to prevent a machine screw from being stripped, or select a certain rotational speed, although being a low speed, for a wood screw to be easily tapped. However, when trying to perform an adjustment with the trigger switch to a low speed, the position at which the adjustment is easily performed differs depending on the size of the user's hand. By making the amount of play also adjustable together with the adjustment of the minimum rotational speed, since a user with a large hand can reach a far position, with the amount of play being set to be small, setting is easily performed in the low speed range. Since it is difficult for a user with a small hand to operate at a far position, with the amount of play being set to be large, it becomes easy to perform setting in the low speed range.

Figure 11:
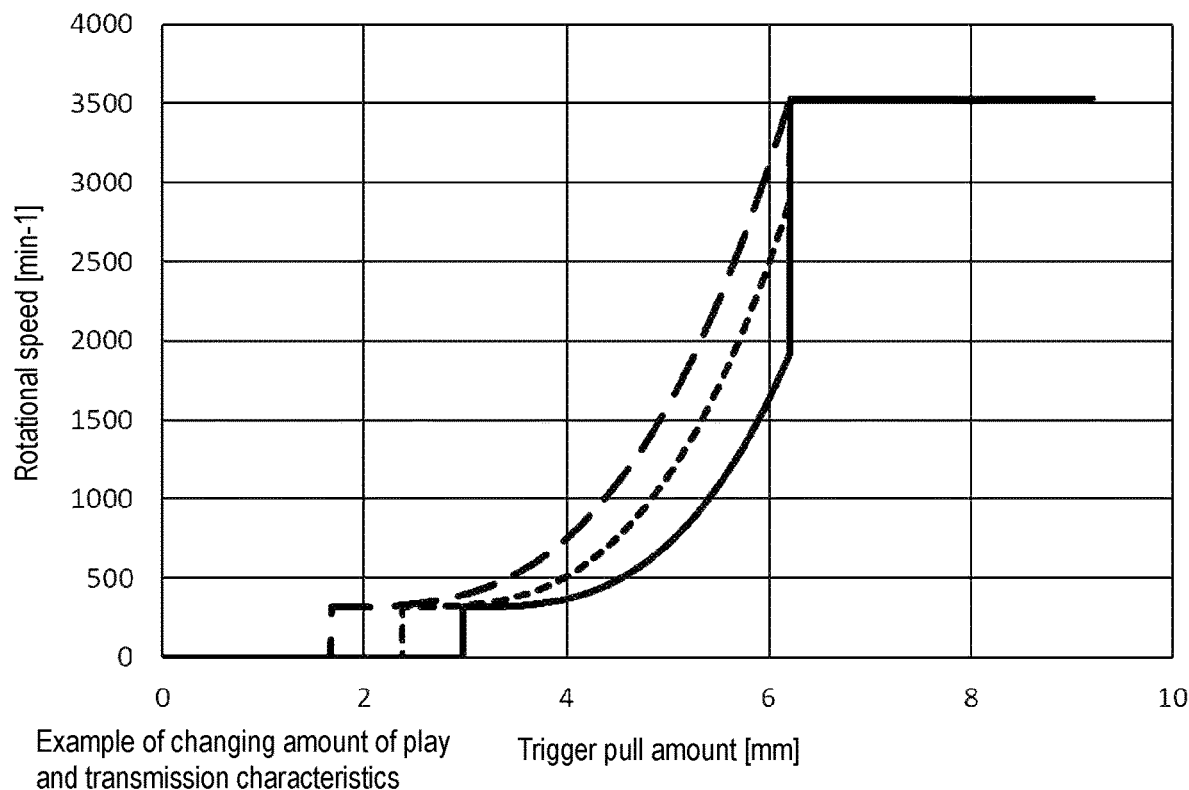
FIG. 11 is a graph also showing a relationship between the trigger pull amount and the rotational speed of the electrical equipment 1, and showing an example of changing the amount of play and the transmission characteristics.

FIG. 11 is a graph also showing a relationship between the trigger pull amount and the rotational speed of the electrical equipment 1, and showing an example of changing the amount of play and the transmission characteristics. In this case, the minimum rotational speed and the maximum rotational speed are constant, but the amount of play and the transmission characteristics may be set to be different.

As an advantage of changing the transmission characteristics, it is possible to select to, for example, make it easy to make fine adjustments in the low speed range or make it easy to make fine adjustments in the medium speed range. However, as the position at which adjustment is easily performed differs depending on the size of the user's hand, by making the amount of play also adjustable together with the adjustment of the transmission characteristics, optimum or more appropriate settings may be performed. In other words, since a user with a large hand can reach a far position, with the amount of play being set to be small, the equipment is easy to use even when the transmission characteristics are changed. Since it is difficult for a user with a small hand to operate at a far position, with the amount of play being set to be large, the equipment is easy to use even when the transmission characteristics are changed.

Figure 12:
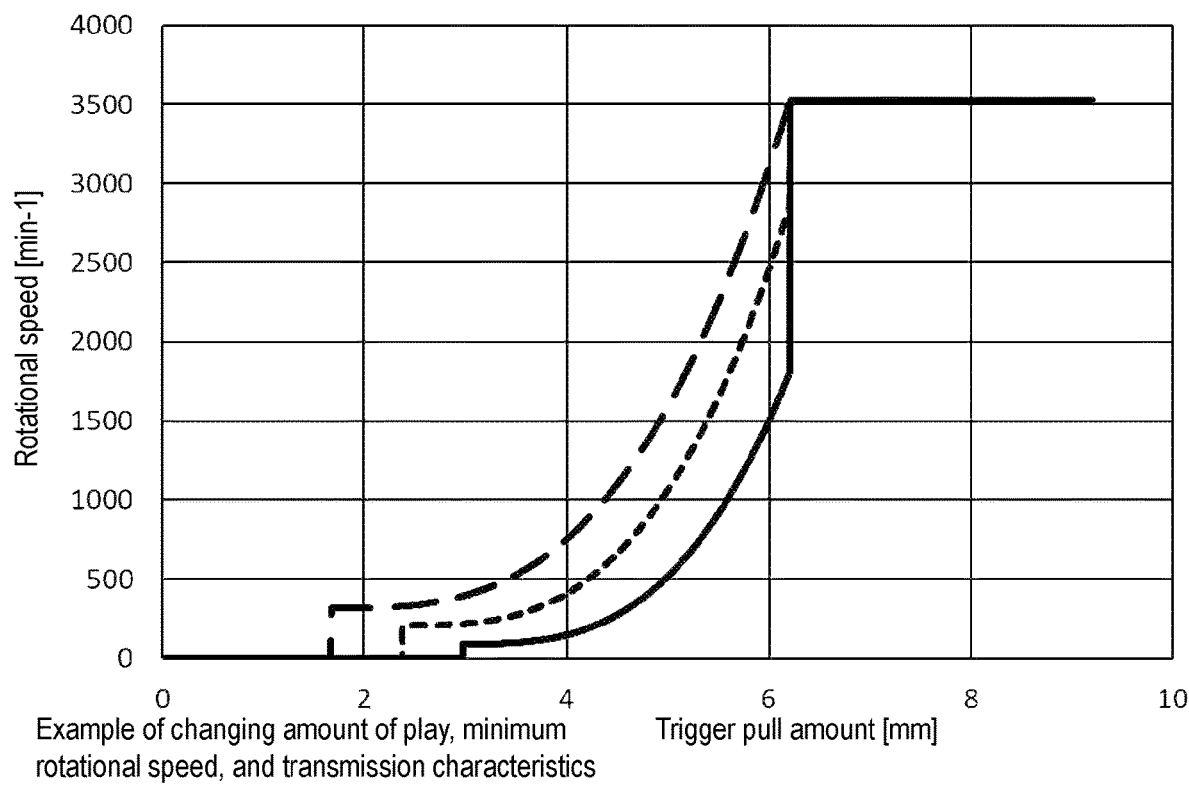
FIG. 12 is a graph also showing a relationship between the trigger pull amount and the rotational speed of the electrical equipment 1, and showing an example of changing the amount of play, the minimum rotational speed, and the transmission characteristics.

FIG. 12 is a graph also showing a relationship between the trigger pull amount and the rotational speed of the electrical equipment 1, and showing an example of changing the amount of play, the minimum rotational speed, and the transmission characteristics. In this case, the maximum rotational speed is constant, but the amount of play, the minimum rotational speed, and the transmission characteristics may be set to be different. In this case, settings more diverse than in the cases of FIG. 10 and FIG. 11 may be performed.

Figure 13:
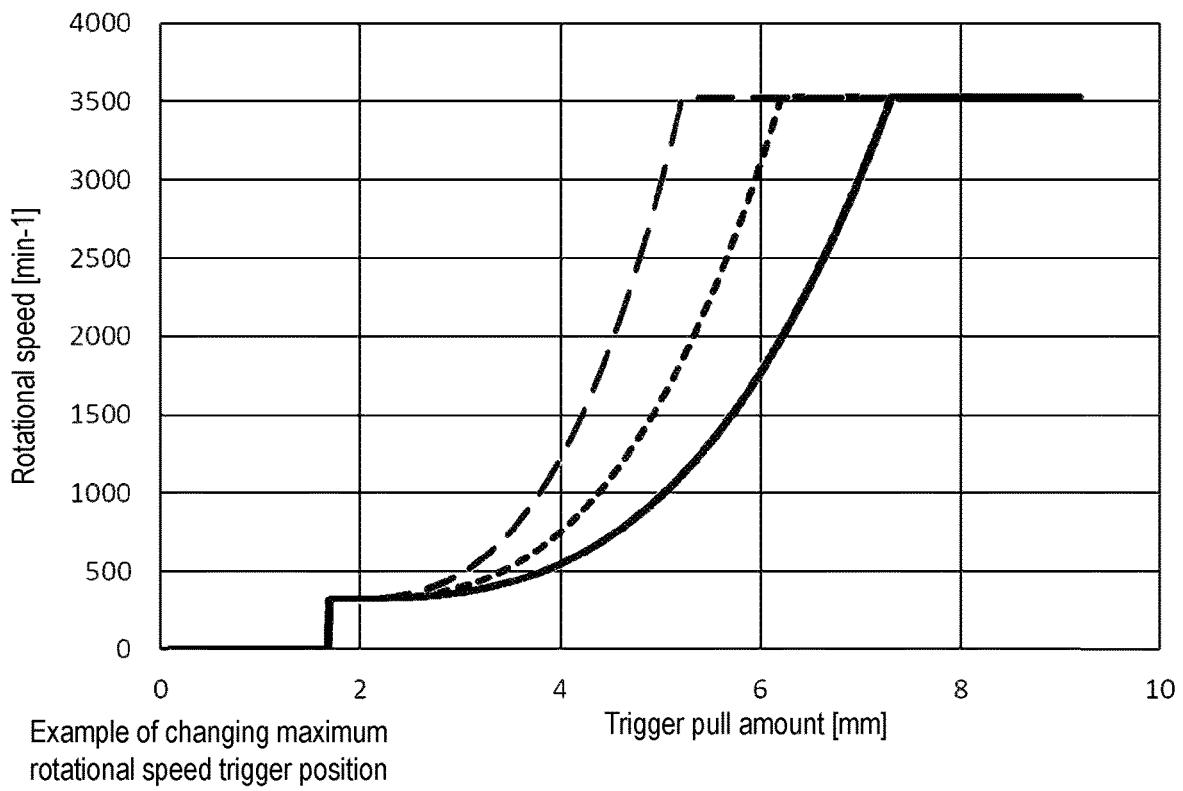
FIG. 13 is a graph also showing a relationship between the trigger pull amount and the rotational speed of the electrical equipment 1, and showing an example of changing the maximum rotational speed trigger position.

FIG. 13 is a graph also showing a relationship between the trigger pull amount and the rotational speed of the electrical equipment 1, and showing an example of changing the maximum rotational speed trigger position. In this case, the minimum rotational speed and the maximum rotational speed are constant, but the maximum rotational speed trigger position, that is, the trigger pull amount to reach the maximum rotational speed, may be changed, and the maximum rotational speed trigger position may be set within a range of approximately 5 to 7 mm.

Figure 14:
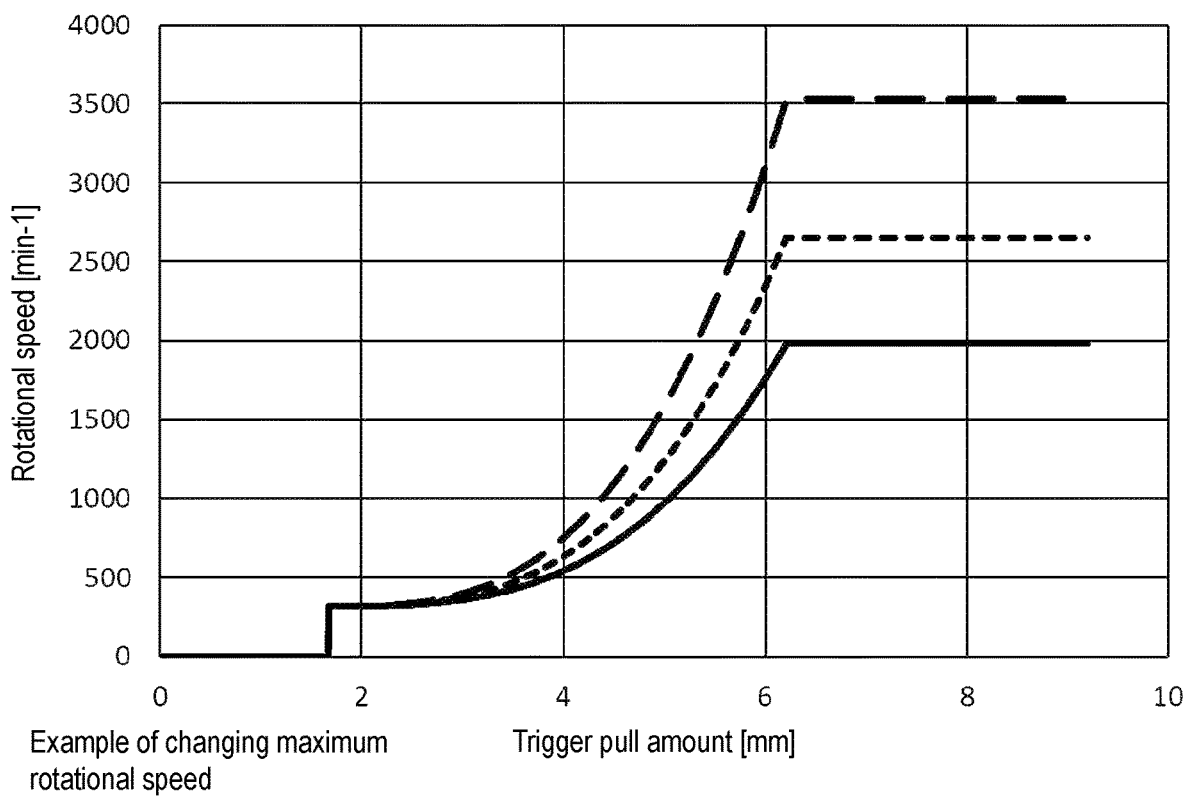
FIG. 14 is a graph also showing a relationship between the trigger pull amount and the rotational speed of the electrical equipment 1, and showing an example of changing the maximum rotational speed.

FIG. 14 is a graph also showing a relationship between the trigger pull amount and the rotational speed of the electrical equipment 1, and showing an example of changing the maximum rotational speed. The maximum rotational speed may be adjusted in a range of 2000 to 3500 rotations per minute.

If the user is accustomed to handling the tool and wants to work quickly, a setting with a high maximum rotational speed is suitable, and if the user is not accustomed to handling the tool, a setting with a low maximum rotational speed is suitable, so there is an advantage that the maximum rotational speed may be set according to the user's proficiency.

Figure 15:
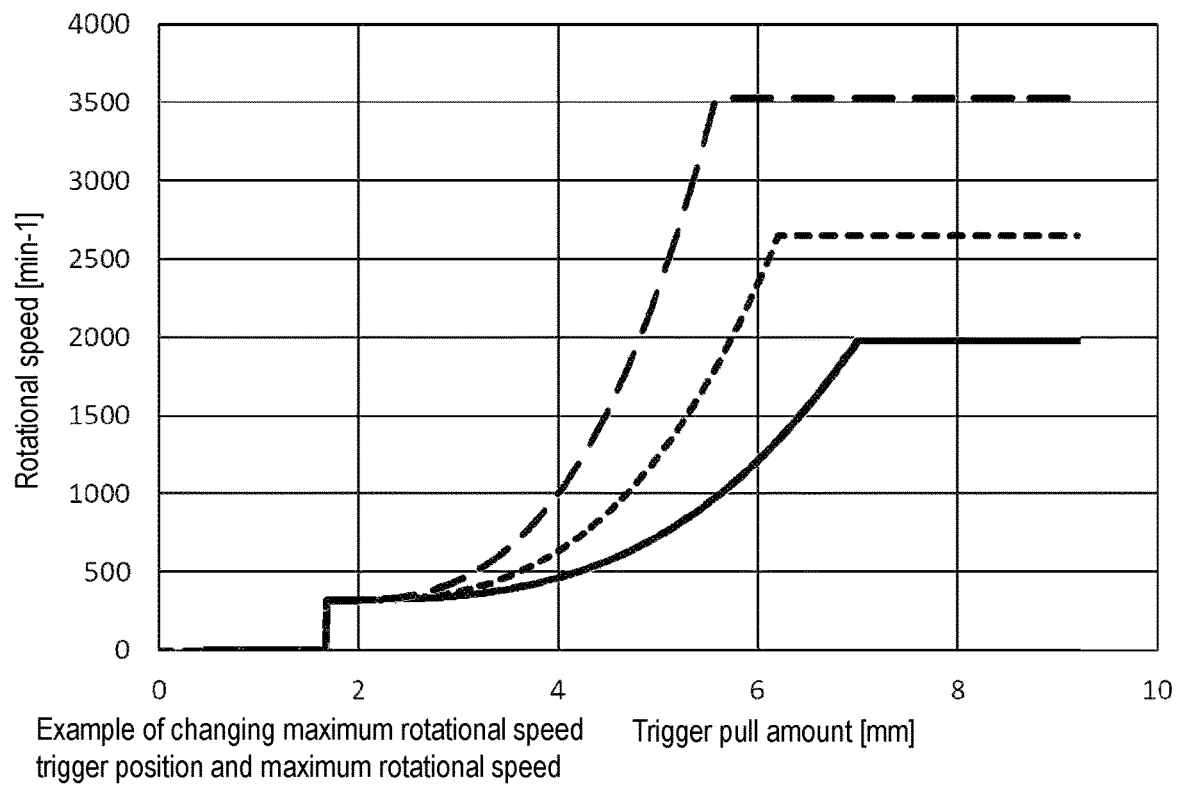
FIG. 15 is a graph also showing a relationship between the trigger pull amount and the rotational speed of the electrical equipment 1, and showing an example of changing the maximum rotational speed trigger position and the maximum rotational speed.

FIG. 15 is a graph also showing a relationship between the trigger pull amount and the rotational speed of the electrical equipment 1, and showing an example of changing the maximum rotational speed trigger position and the maximum rotational speed. The minimum rotational speed is constant, but the maximum rotational speed trigger position may be set within a range of approximately 5 to 7 mm, and the maximum rotational speed may be adjusted within a range of 2000 to 3500 rotations per minute.

Figure 16:
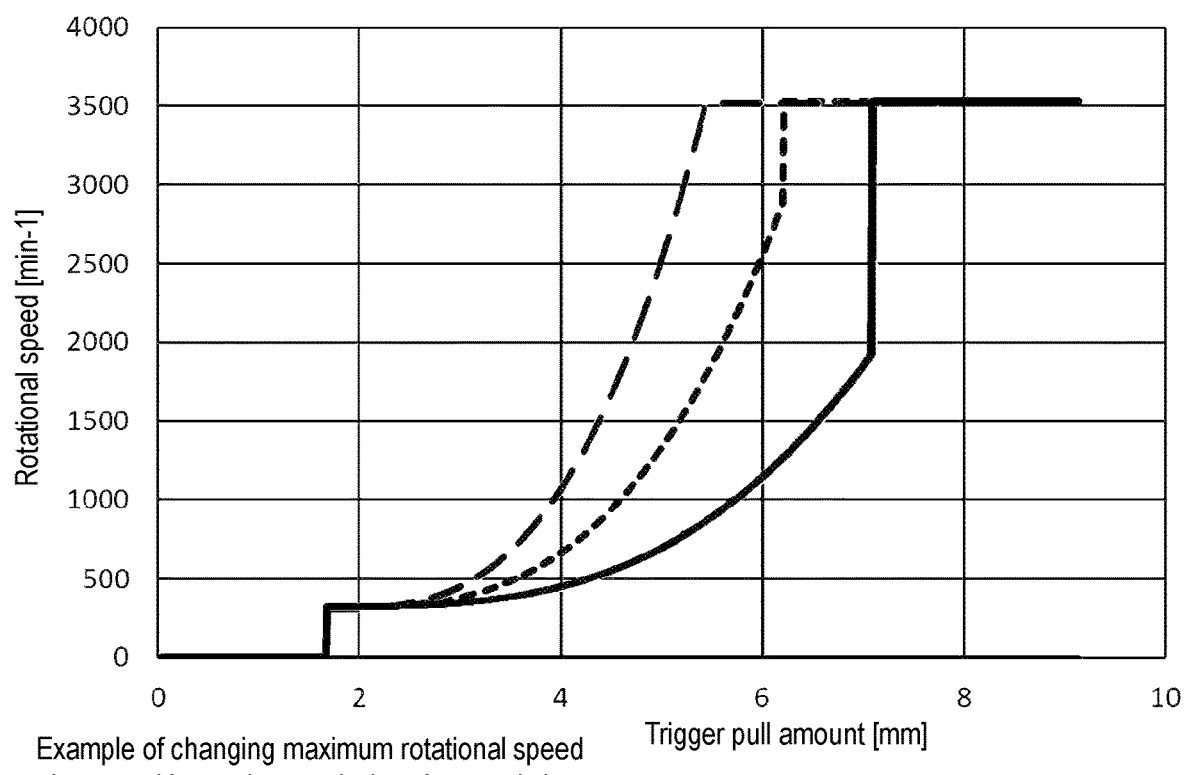
FIG. 16 is a graph also showing a relationship between the trigger pull amount and the rotational speed of the electrical equipment 1, and showing an example of changing the maximum rotational speed trigger position and the transmission characteristics.

FIG. 16 is a graph also showing a relationship between the trigger pull amount and the rotational speed of the electrical equipment 1, and showing an example of changing the maximum rotational speed trigger position and the transmission characteristics. In this case, the minimum rotational speed and the maximum rotational speed are constant, but the maximum rotational speed trigger position may be set within a range of approximately 5 to 7 mm, and the transmission characteristics may be changed.

As an advantage of changing the transmission characteristics, it is possible to select to, for example, make it easy to make fine adjustments in the low speed range or make it easy to make fine adjustments in the medium speed range. However, as the position at which adjustment is easily performed differs depending on the size of the user's hand, by making the maximum rotational speed trigger position also adjustable together with the adjustment of the transmission characteristics, more appropriate settings may be performed.

Figure 17:
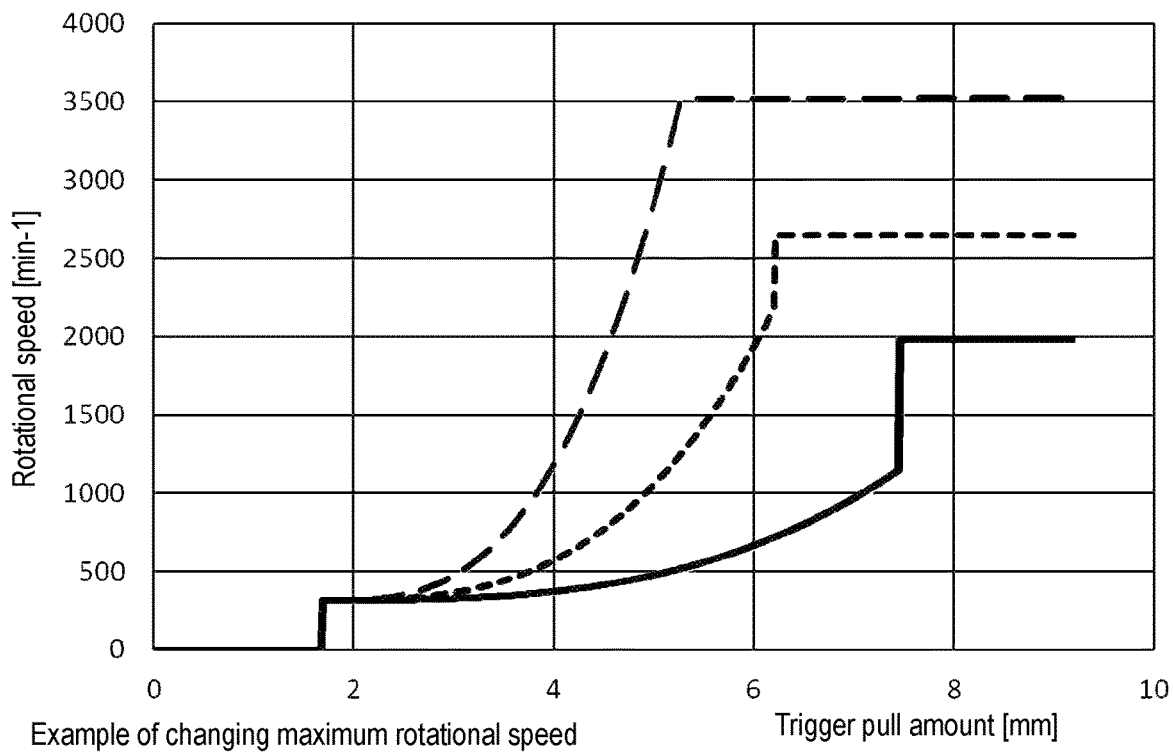
FIG. 17 is a graph also showing a relationship between the trigger pull amount and the rotational speed of the electrical equipment 1, and showing an example of changing the maximum rotational speed trigger position, the maximum rotational speed, and the transmission characteristics.

FIG. 17 is a graph also showing a relationship between the trigger pull amount and the rotational speed of the electrical equipment 1, and showing an example of changing the maximum rotational speed trigger position, the maximum rotational speed, and the transmission characteristics. In this case, the minimum rotational speed is constant, but the maximum rotational speed trigger position may be set within a range of approximately 5 to 7 mm, the maximum rotational speed may be adjusted within a range of 2000 to 3500 rotations per minute, and the transmission characteristics may also be changed.

Figure 18:
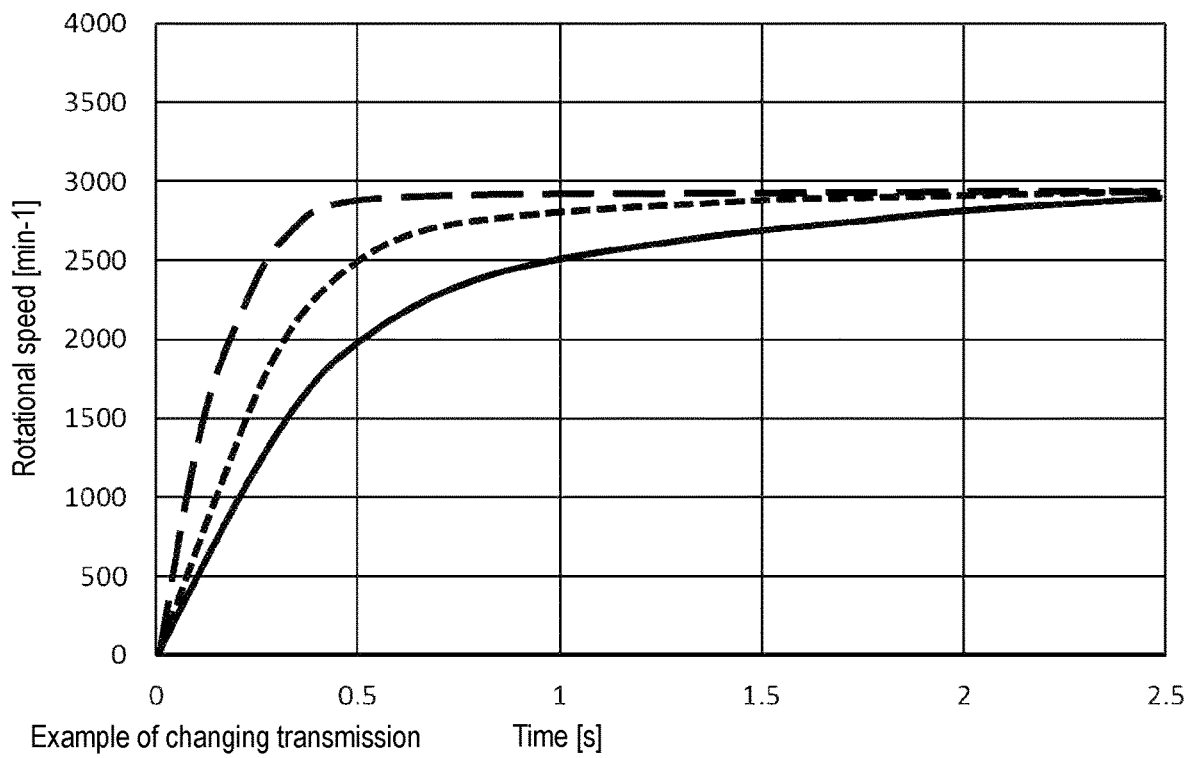
FIG. 18 is a graph showing a relationship between time and the rotational speed in the electrical equipment 1, and showing an example of changing the acceleration characteristics when the trigger pull amount is at its maximum.

FIG. 18 is a graph showing a relationship between time and the rotational speed in the electrical equipment 1, and showing an example of changing the acceleration characteristics when the trigger pull amount is at its maximum. The time taken from when the motor is started until it reaches a constant speed may be changed. That is, the set value of the soft start may be changed.

If the user is accustomed to handling the tool and wants to work quickly, a setting with a high rotational speed increase rate is suitable; if one does not care about work speed but wants to suppress cam-out, a setting with a low rotational speed increase rate is suitable, so the rotational speed increase rate may be set according to the user's proficiency.

Figure 19:
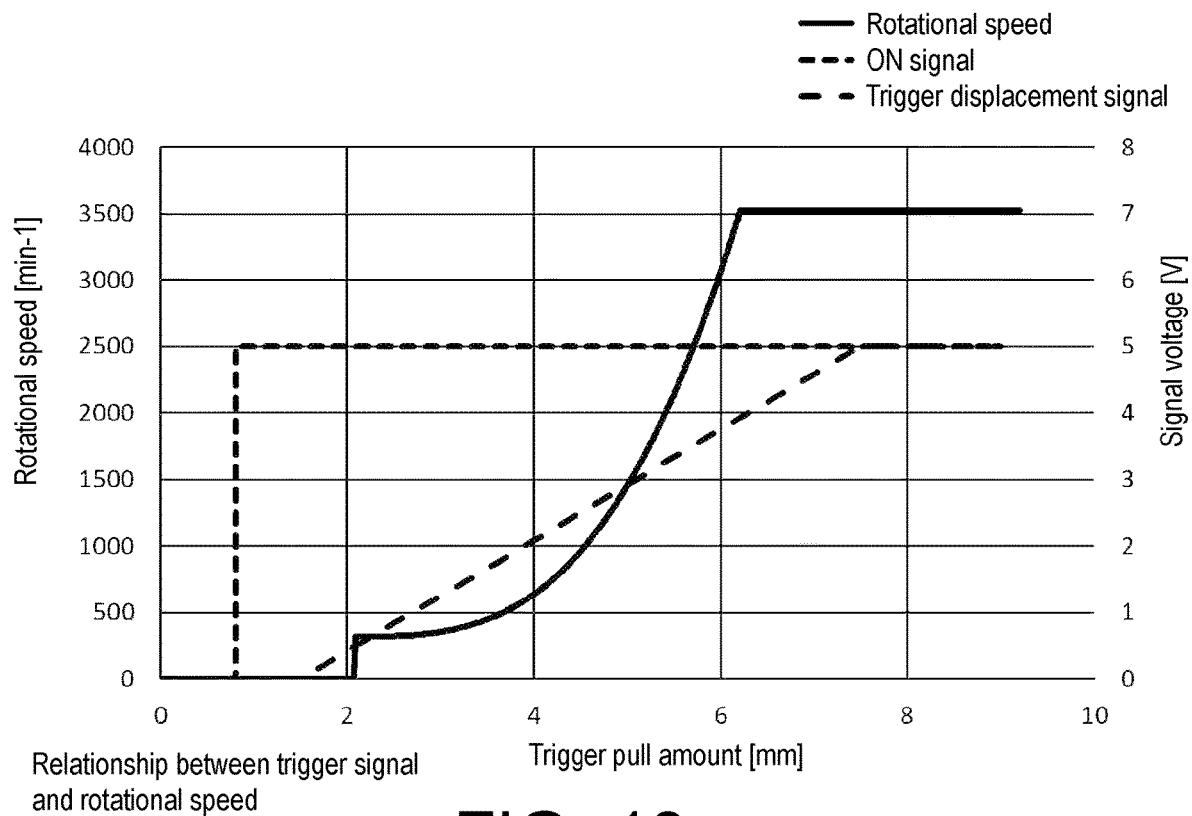
FIG. 19 is a graph showing a relationship between the trigger pull amount and signal voltages of an ON signal and a trigger displacement signal in the electrical equipment 1, and showing a relationship between the trigger pull amount and the rotational speed.

FIG. 19 is a graph showing a relationship between the trigger pull amount and signal voltages of an ON signal and a trigger displacement signal in the electrical equipment 1, and showing a relationship between the trigger pull amount and the rotational speed. In this case, a trigger ON signal is outputted from the switch operation detection circuit 42 to the arithmetic part 40 at a position where the trigger pull amount is approximately 1 mm (the ON signal rises). When the trigger pull amount reaches a position of approximately 2 mm, a trigger displacement signal is outputted from the switch operation detection circuit 42 to the arithmetic part 40, and thereafter, the voltage value of the trigger displacement signal increases linearly toward 5V in proportion to the increase in the trigger pull amount. Upon input of such trigger ON signal and trigger displacement signal, the arithmetic part 40 outputs a drive signal corresponding to these signals to the control signal circuit 43, and the control signal output circuit 43 rotates the motor 3 by outputting a control signal to each control terminal of the switching elements Q1 to Q6 of the inverter circuit. The rotational speed of the motor 3 (anvil 8) changes from the minimum rotational speed to the maximum rotational speed according to this control signal. By changing the slope of the trigger displacement signal, it is possible to change the time (set value of soft start, set value of transmission characteristics) taken for the motor to reach the maximum rotational speed.

Figure 20:
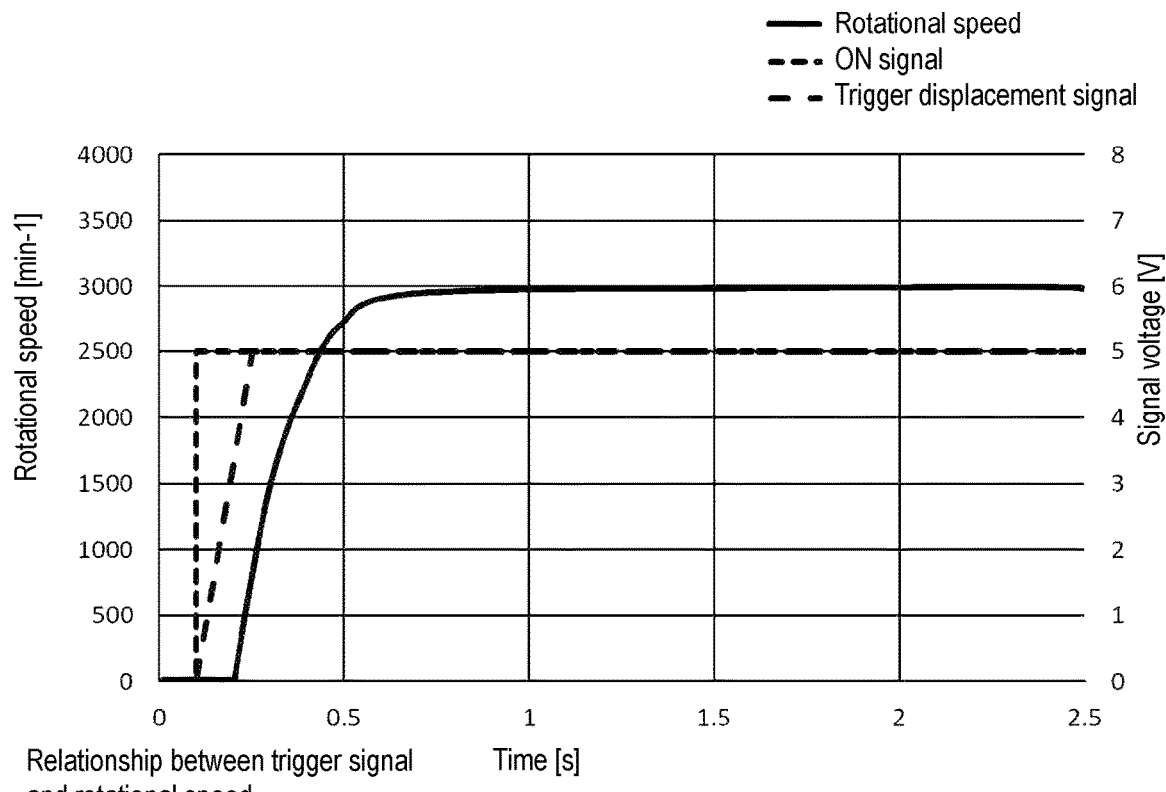
FIG. 20 is a graph showing a relationship between time and the signal voltages of the ON signal and the trigger displacement signal in the electrical equipment 1, and showing a relationship between time and the rotational speed.

FIG. 20 is a graph showing a relationship between time and the signal voltages of the ON signal and the trigger displacement signal in the electrical equipment 1, and showing a relationship between time and the rotational speed. In this case, when the trigger pull amount is increased from zero to the maximum, the trigger ON signal rises, and at the same time the trigger displacement signal rapidly rises to 5V. With such a trigger displacement signal, the rotational speed reaches 3000 rotations per minute from zero rotations at startup. By changing the slope of the trigger displacement signal, it is possible to change the time (set value of soft start) taken for the motor to reach the maximum rotational speed when the trigger pull amount is at its maximum, and the operation parameter (set value of transmission characteristics) related to the degree of rotational speed change between the minimum rotational speed and the maximum rotational speed corresponding to the trigger pull amount.

Figure 21:
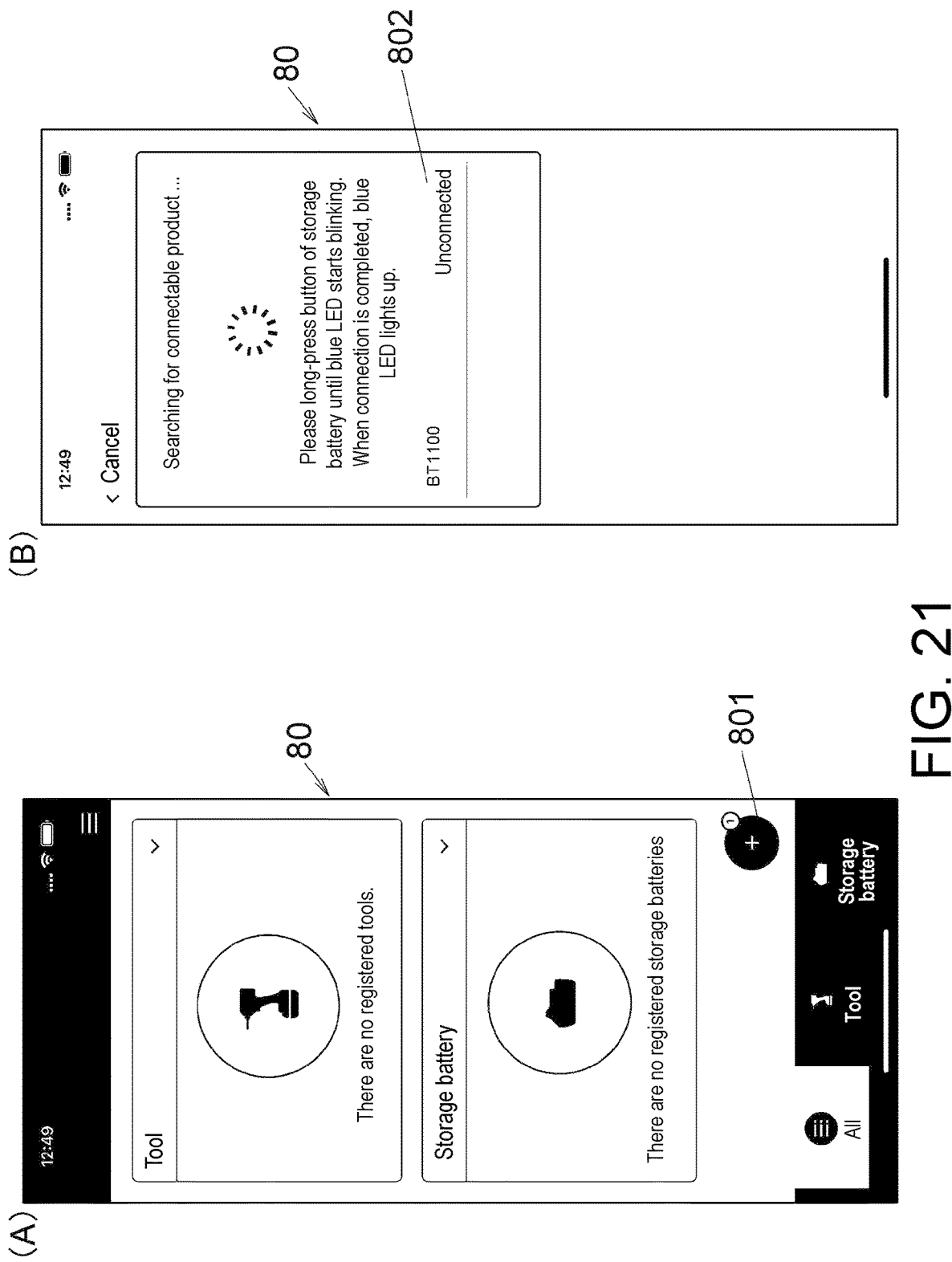
FIG. 21 shows screens of the portable terminal 80 installed with a management application for customizing various settings of the electrical equipment 1 (electrical equipment main body, referred to as "Tool" in the screens hereinafter) and selecting the battery pack 20 (referred to as "Storage battery" in the screens hereinafter), (A) of FIG. 21 shows a registration list screen (no registered image), and (B) of FIG. 21 shows a new registration screen of a storage battery.

(A) of FIG. 21 shows a registration list screen (no registered tool and storage battery) of the portable terminal 80 installed with a management application for customizing various settings of the electrical equipment 1 (referred to as "Tool" in the screens hereinafter) and selecting the battery pack 20 (referred to as "Storage battery" in the screens hereinafter), and (B) of FIG. 21 shows a new registration screen of a storage battery in a state (unconnected) of searching for a connectable product, herein the battery pack 20. (A) of FIG. 21 shows that with "All" being tapped among "All", "Tool", and "Storage battery" buttons at the bottom of the screen upon start of the management application, no tool and storage battery has been registered.

When the operation button 27a of the battery pack 20 in FIG. 5 is long-pressed and the right-end blue LED (window 27b) of the panel part 27 blinks, a connection standby state is established. When a "+" button 801 is tapped on the screen of (A) of FIG. 21, the number of storage batteries in a communicable state is displayed (the number being "1" in the figure), and if the button is tapped when the number is displayed, the screen transitions to the screen of (B) of FIG. 21 for searching for connectable products (tools and storage batteries). The screen displays the model name of a storage battery in the communicable state. Herein, for example, it is shown that "BT1100" is retrieved as the storage battery and is in an unconnected state. By tapping a text 802 "unconnected" next to the model name of the storage battery on the screen of (B) of FIG. 21, connection of the displayed storage battery is performed. When the connection is completed, the blue LED provided at the position corresponding to the right-end window 27b lights up, and the screen transitions to the screen in (A) of FIG. 22.

Figure 22:
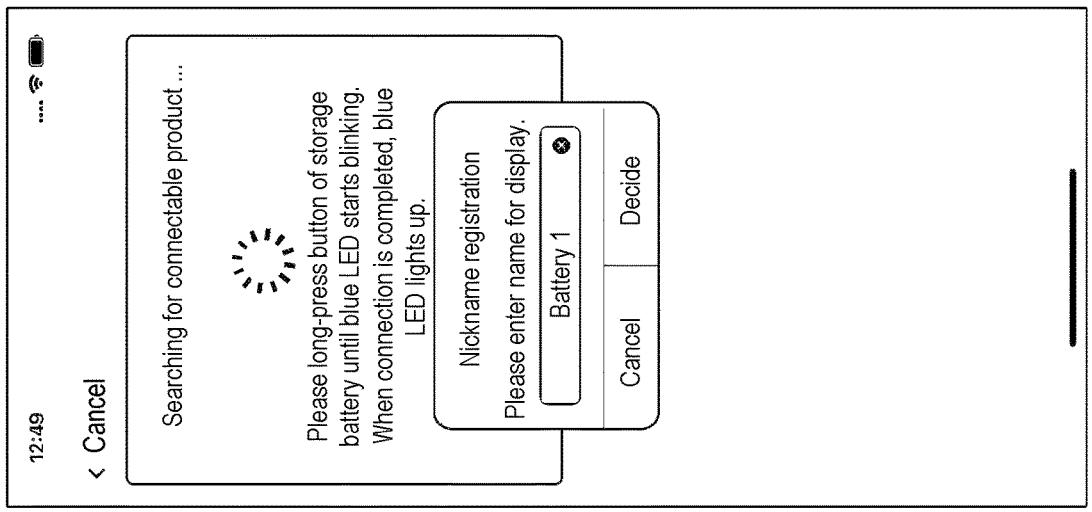
FIG. 22 also shows screens of the portable terminal 80, (A) of FIG. 22 is a nickname registration screen for the storage battery in the connected state, and (B) of FIG. 22 is a photographed image registration screen for the storage battery in the connected state.
Figure 22:
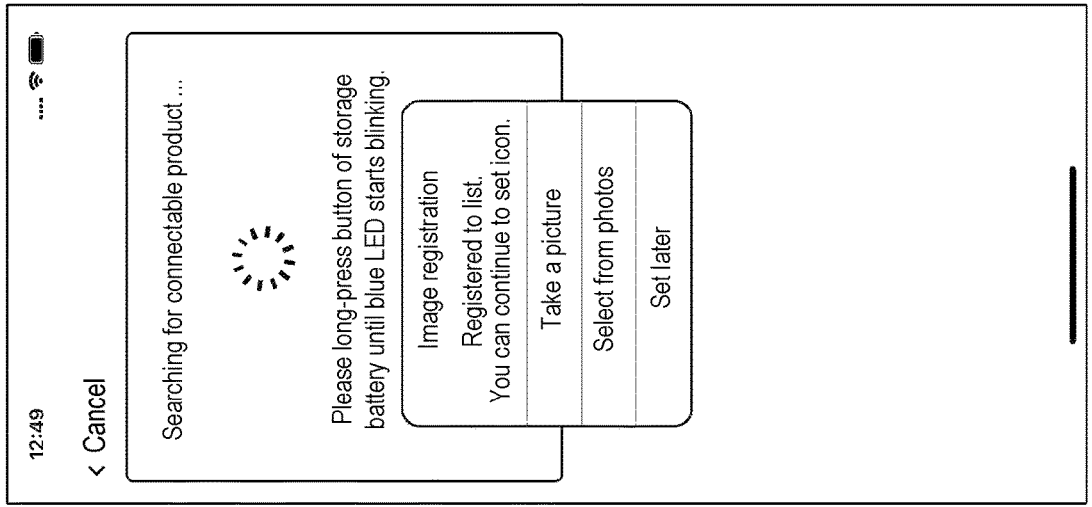

(A) of FIG. 22 is a nickname registration screen for the storage battery in the connected state, and when a nickname, e.g., "Battery 1", is entered in a nickname input pop-up and a "Decide" button is tapped, the screen transitions to a photographed image registration screen of the storage battery in the connected state in (B) of FIG. 22. In (B) of FIG. 22, when any one of "Take a picture", "Select from photos" (catalog photos are prepared by default), or "Set later" is selected for registration, the screen transitions to a storage battery information display screen (tool not connected) in (A) of FIG. 23.

Figure 23:
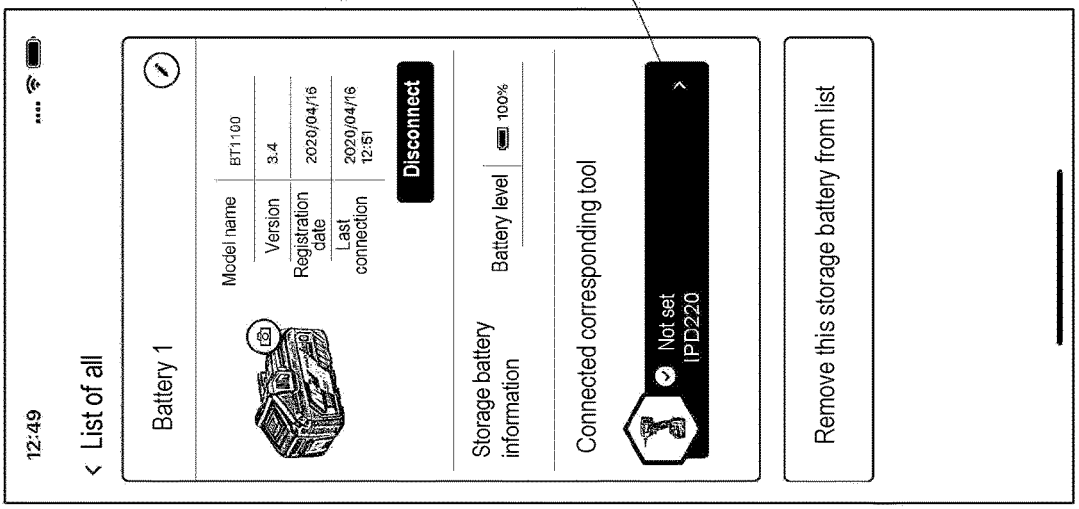
FIG. 23 also shows screens of the portable terminal 80, (A) of FIG. 23 is a storage battery information display screen (tool not connected) in the connected state, and (B) of FIG. 23 is a storage battery information display screen in which a tool serving as the electrical equipment 1 is in the connected state.
Figure 23:
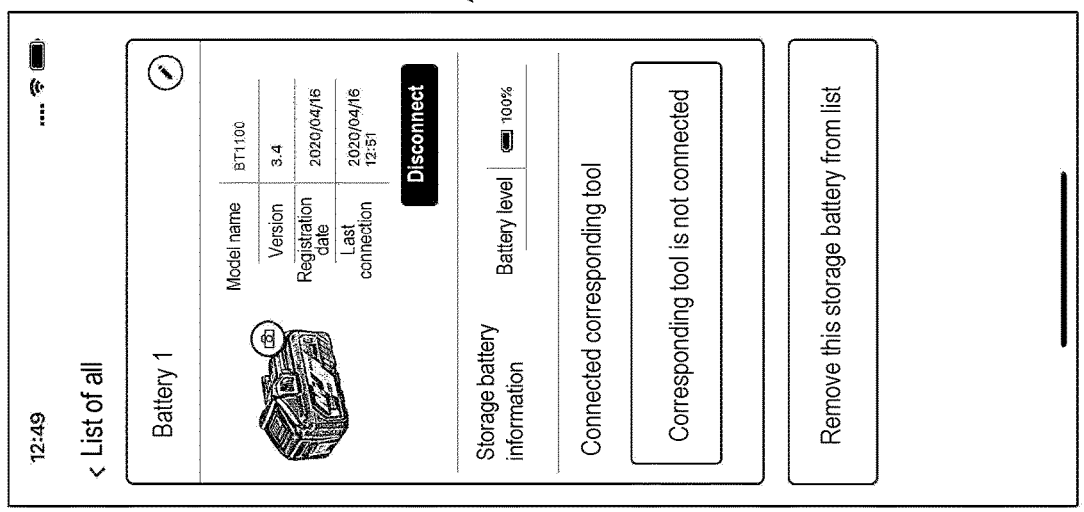

(A) of FIG. 23 is a battery information display screen (tool not connected) of information such as the model name of the storage battery in the connected state, in which processes such as change of the nickname and the image (photograph), disconnection, storage battery registration removal, etc. may be performed. When a corresponding tool is connected to the storage battery and the operation part 11b of FIG. 4 on the electrical equipment 1 side is pressed to align the displayed position of the display part with the App display part 11a, the App display part 11a lights up in a color (e.g., red) before operation parameter setting. Further, by connecting the corresponding tool to the storage battery, the screen transitions to a battery information display screen (unregistered tool) in (B) of FIG. 23. In (B) of FIG. 23, when a tool connection status display button 803 (displayed as "Not set IPD220") of the connected corresponding tool is tapped, the screen transitions to a nickname registration screen of the tool in the connected state in (A) of FIG. 24.

Figure 24:
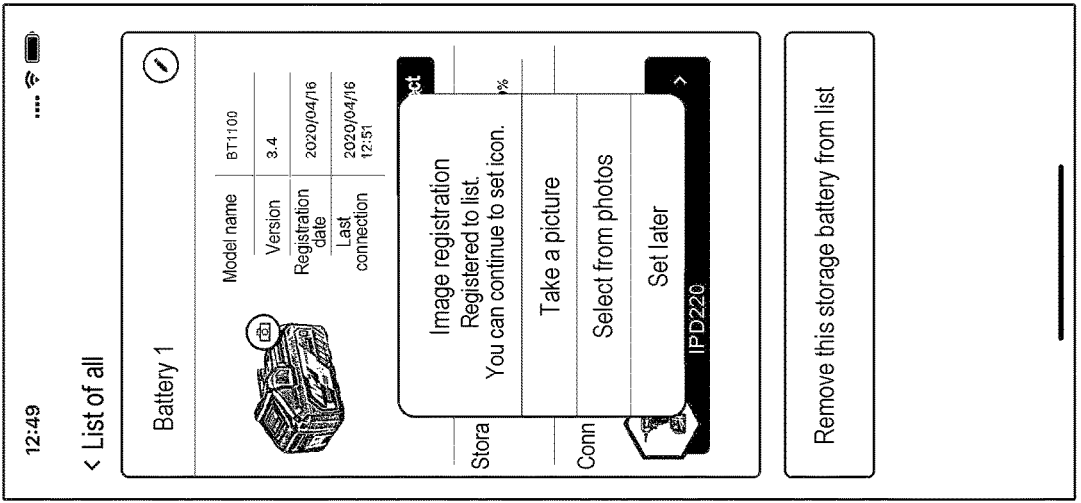
FIG. 24 also shows screens of the portable terminal 80, (A) of FIG. 24 is a nickname registration screen of the tool in the connected state, and (B) of FIG. 24 is a photographed image registration screen of the tool in the connected state.
Figure 24:
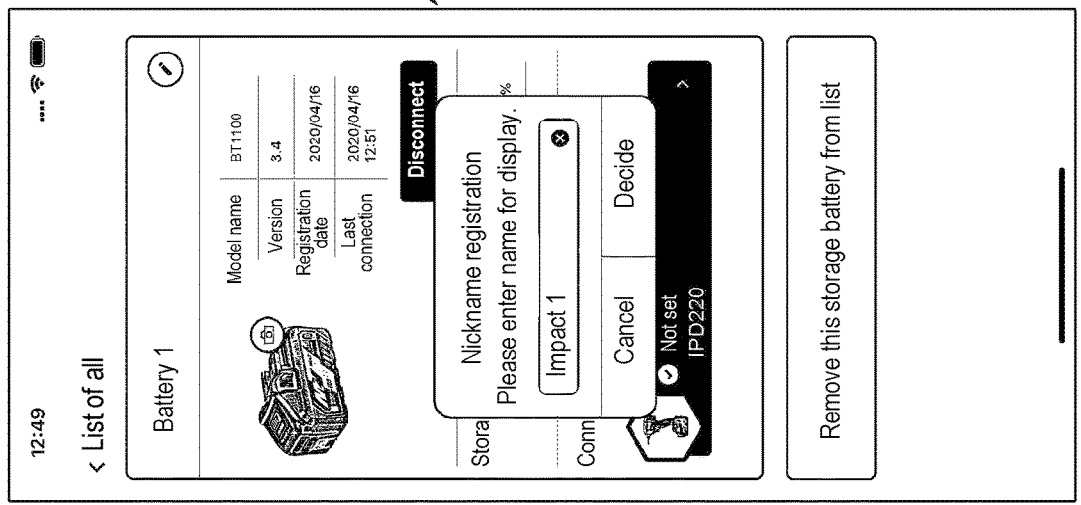

On the registration screen in (A) of FIG. 24, when a nickname, e.g., "Impact 1", is entered in a nickname input pop-up and a "Decide" button is tapped, the screen transitions to a photographed image registration screen of the tool in the connected state in (B) of FIG. 24. In (B) of FIG. 24, when one of "Take a picture", "Select from photos" (catalog photos are prepared by default), and "Set later" is selected for registration, the screen transitions to a tool information display screen in (A) of FIG. 25. Information such as photos and nicknames of the tools serving as the battery pack 20 and the electrical equipment 1 is stored in a storage part within the application (inside the external device).

Figure 25:
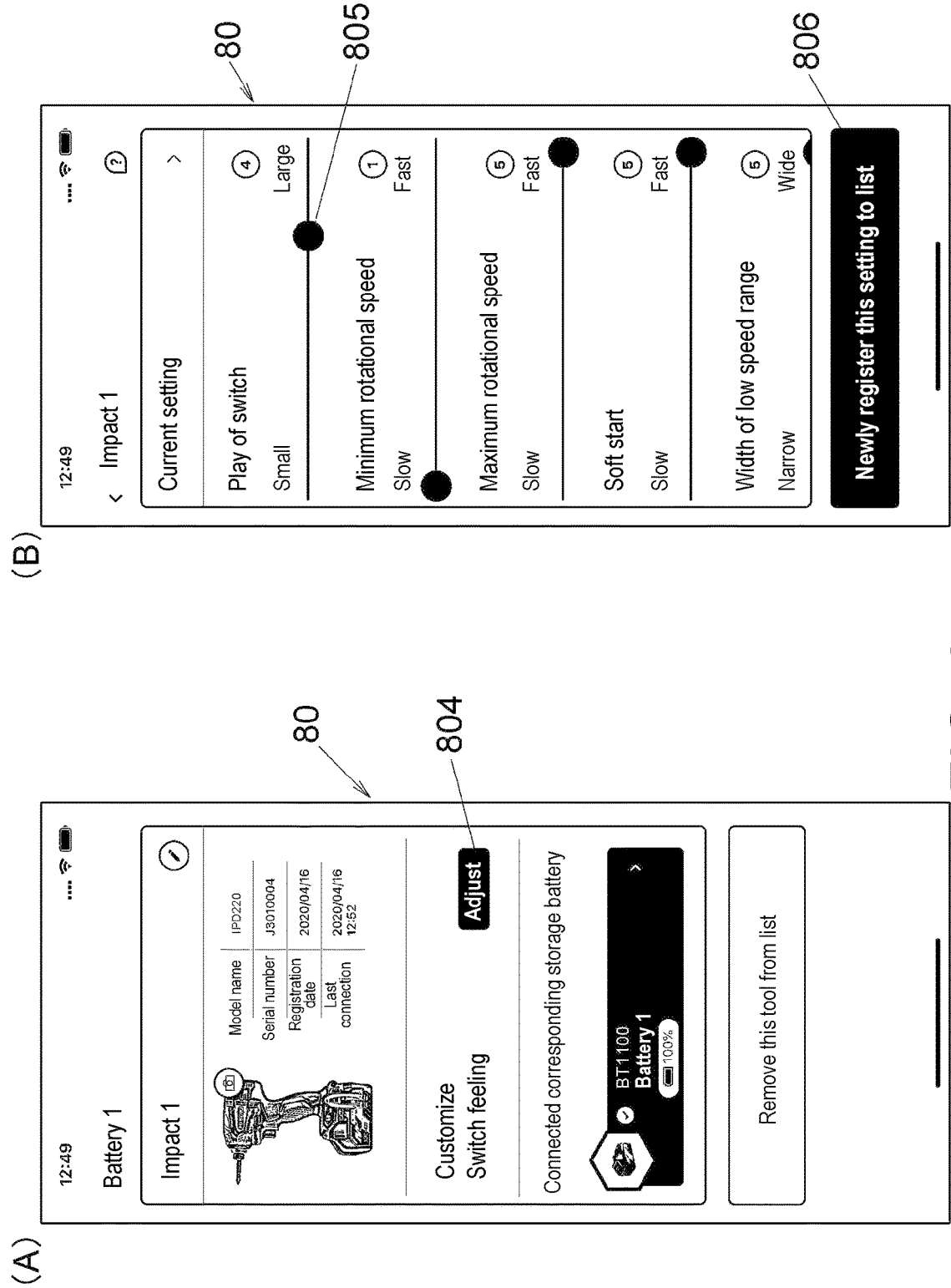
FIG. 25 also shows screens of the portable terminal 80, (A) of FIG. 25 is a tool information display screen which allows selection of display of the tool and the storage battery in the connected state and customization adjustment of a switch feeling of the tool, and (B) of FIG. is a feeling adjustment screen for customizing the switch feeling of the tool.

(A) of FIG. 25 is a tool information display screen of information such as the model name of the tool in the connected state, in which processes such as change of the nickname and the image (photograph), tool registration removal, etc. may be performed. When a feeling adjustment button 804 in a "customize, switch feeling" item is tapped, the screen transitions to a feeling adjustment screen in (B) of FIG. 25. On this feeling adjustment screen, it is possible to perform feeling adjustment related to the trigger switch 9 of the electrical equipment 1, that is, to change operation parameter set values, and feeling change sliders 805 are displayed for items such as "Play of switch", "Minimum rotational speed", "Maximum rotational speed", "Soft start" (time taken to reach the maximum rotational speed when the trigger operation amount is at its maximum), and "Width of low speed range" corresponding to the change in the set rotational speed according to the trigger operation (example of changing the set rotational speed according to the trigger operation). By changing the position of the feeling change slider 805, adjustment may be performed in a plurality of levels, e.g., five levels. The current set value among the five levels is displayed next to each item. Further, the configuration may also be continuously adjustable. By tapping a button 806 "Newly register this setting to list" in (B) of FIG. 25, the set values are transmitted to the tool, and the screen transitions to a customized set value saving screen after customization adjustment of the switch feeling in (A) of FIG. 26.

Figure 26:
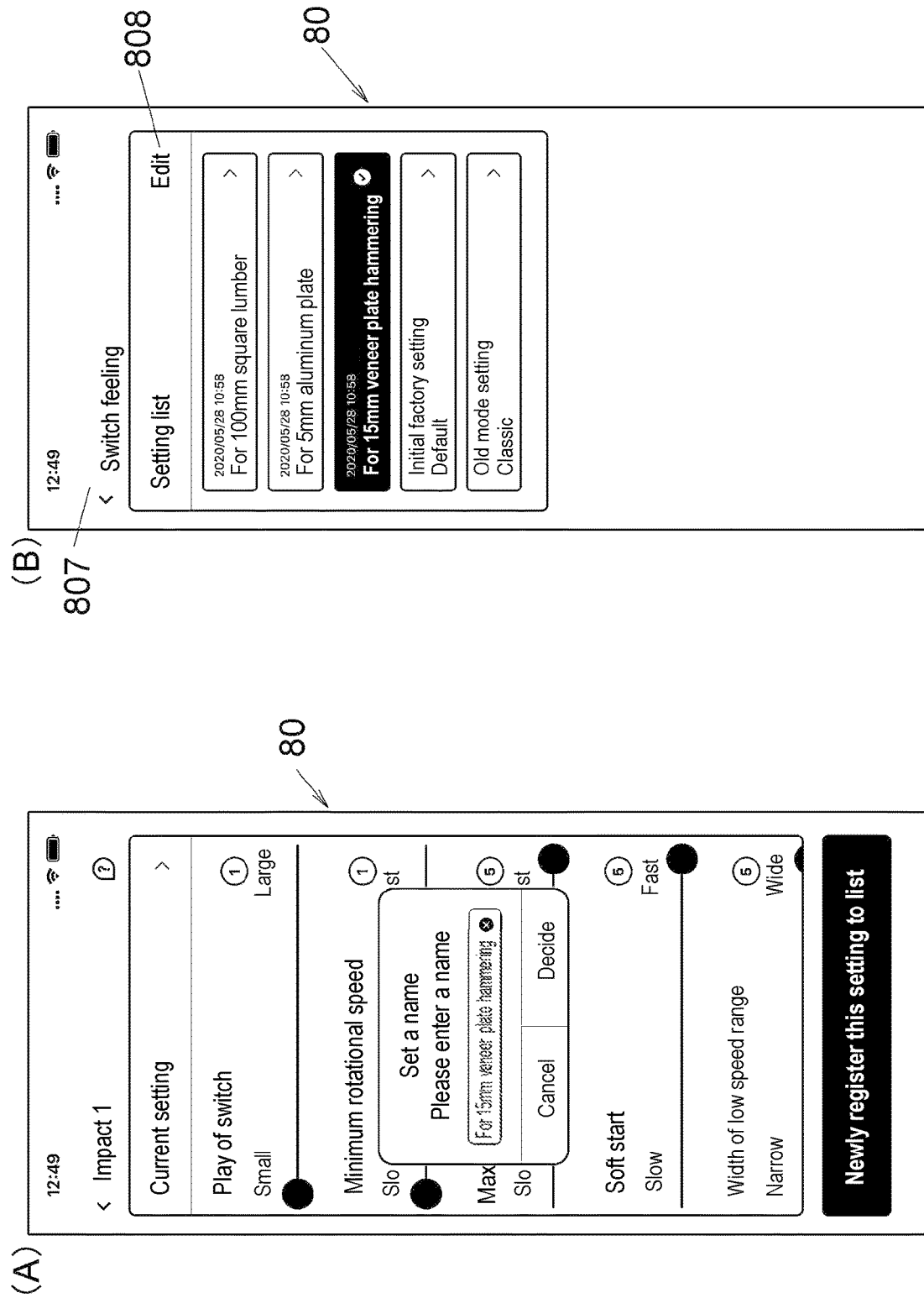
FIG. 26 also shows screens of the portable terminal 80, (A) of FIG. 26 is a customized set value saving screen after customization adjustment of the switch feeling, and (B) of FIG. 26 is a setting list screen of saved customized set values.

On the customized set value saving screen in (A) of FIG. 26, by entering a set value name in a name input pop-up and tapping a "Decide" button, the saving is completed. As the set value name, it is possible to input a target material (square lumber, aluminum plate, veneer plate, etc.) to be machined by the tool, a thickness, etc. Thereafter, the electrical equipment 1 can be used with this customized set value. At this time, the App display part 11a in FIG. 4 lights up in a color (e.g., blue) different from the color before the operation parameter setting to display setting completion of the operation parameter change. Instead of a change in the display color, the setting completion may also be displayed by blinking of the display color.

(B) of FIG. 26 is a setting list screen on which a saved name list of the customized switch feeling may be selected. In the setting list, it is possible to input and display, for example, square lumber, aluminum plate, veneer plate, etc., as the target material to be machined by the tool, and the current set value is indicated by a check mark. By tapping a text 807 "Switch feeling", the screen transitions to the feeling adjustment screen in (B) of FIG. 25. By tapping a text 808 "Edit" in (B) of FIG. 26, the screen transitions to a setting list edit screen in (B) of FIG. 27.

Figure 27:
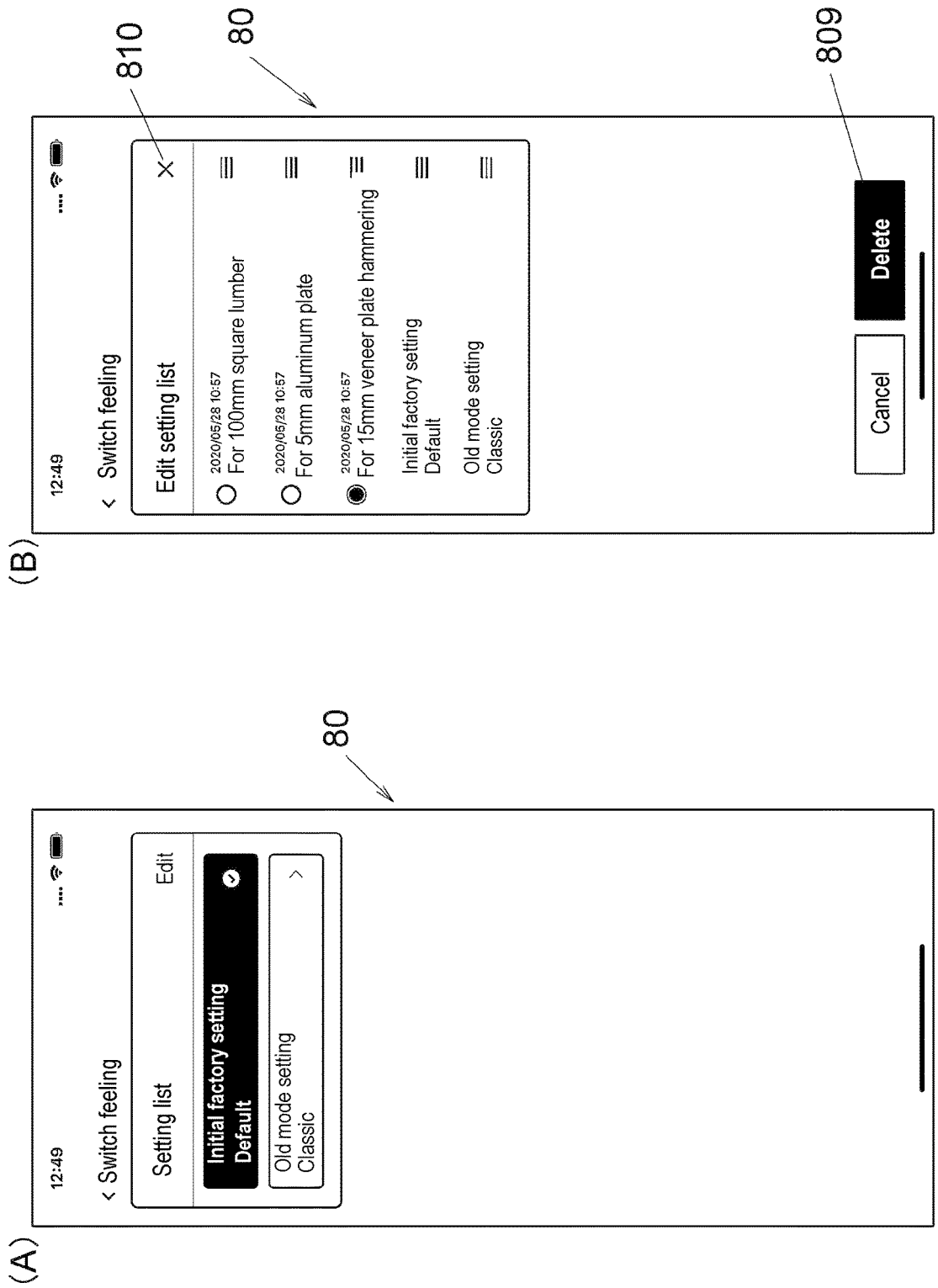
FIG. 27 also shows screens of the portable terminal 80, (A) of FIG. 27 is a setting list screen (initial state) on which only a switch feeling default mode or a classic mode (old default mode) is displayed, and (B) of FIG. 27 is an already saved setting list edit screen.

(A) of FIG. 27 is a setting list screen (initial state) on which only a switch feeling default mode (first initial parameter) or a classic mode (old default mode: second initial parameter) is displayed, and (B) of FIG. 27 is an already saved setting list edit screen. In (B) FIG. 27, by tapping a delete button 809, the checked set value may be deleted. By tapping "x" 810 indicating the end of editing, the screen transitions to the setting list screen in (B) of FIG. 26. The default mode (first initial parameter) may be, for example, a basic specification of a manufacturer that provides this electrical equipment system (all-round specification suitable for all tasks without specializing in one task), and the classic mode (second initial parameter) may be, for example, a specification of a tool already on the market. Even if a user who has purchased a new tool wants to work with a familiar specification (operation parameter) of the tool he/she has been using or wants to work with a basic specification suitable for all tasks, the user can immediately respond (set) without setting from scratch.

Figure 28:
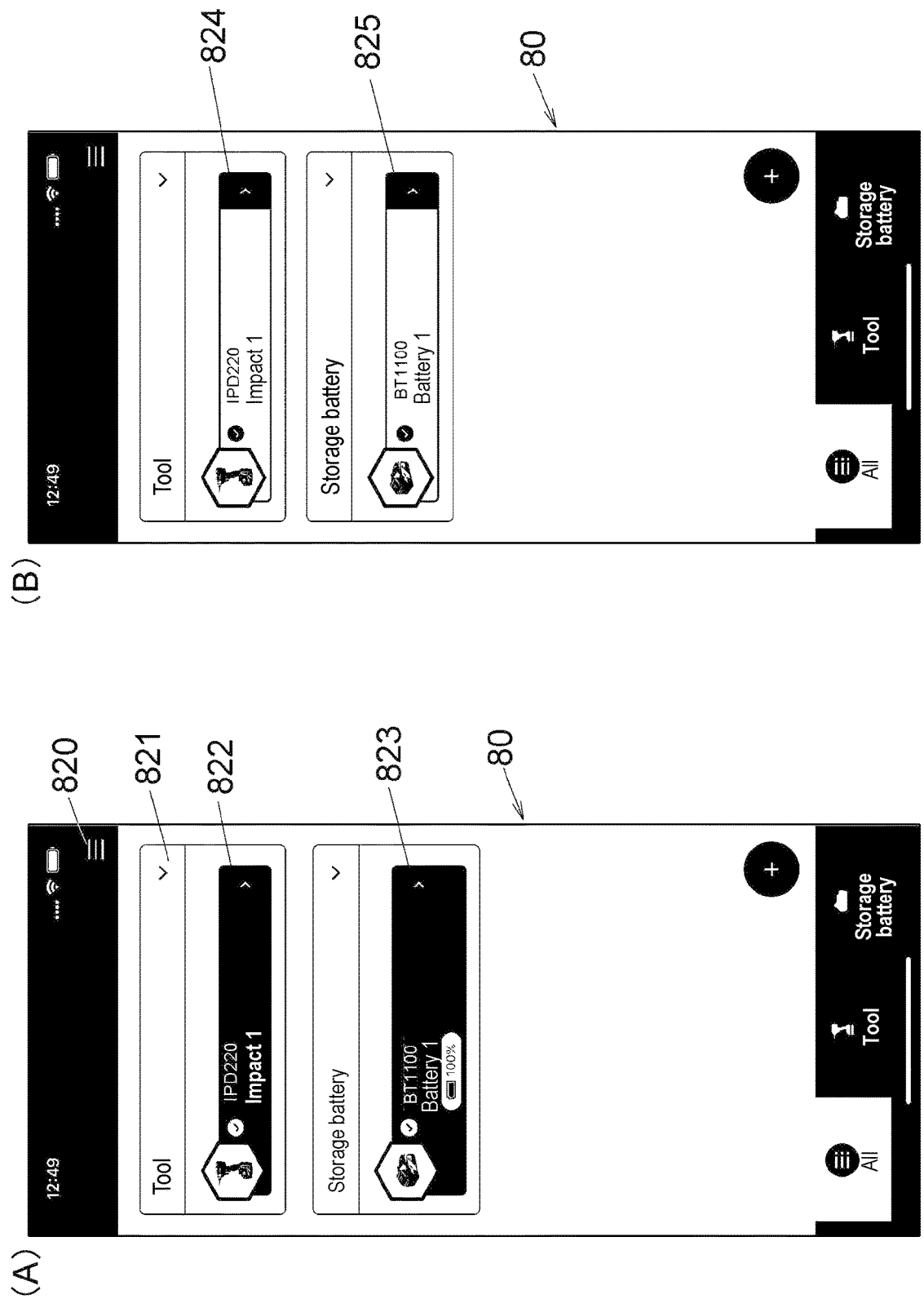
FIG. 28 also shows screens of the portable terminal 80, (A) of FIG. 28 is a registration list screen (all) capable of displaying all registered selectable tools and storage batteries, and (B) of FIG. 28 is a registration list screen (registered and unconnected).

FIG. 28 shows screens for a registered tool list function, (A) of FIG. 28 is a registration list screen (all) capable of displaying all selectable tools and storage batteries, and (B) of FIG. 28 is a registration list screen (registered and unconnected), which is a display screen showing that the tool and storage battery are registered but communication cannot be established. On the registration list screen in (A) of FIG. 28, by tapping a menu 820, the screen transitions to a menu screen of FIG. 32. By tapping a right end part 821 of the tool, the screen transitions to a folded tool list screen (folded) in (A) of FIG. 30. By tapping a right end part 822 of the listed tool name, the screen transitions to the tool information display screen in (A) of FIG. 25. By tapping a right end part 823 of the listed storage battery name, the screen transitions to a storage battery information display screen (registered and tool connected) in (B) of FIG. 30. By tapping the "Tool" button at the bottom of the screen, the screen transitions to a tool list screen (tools only) in (A) of FIG. 29, and by tapping the "Storage battery" button, the screen transitions to a tool list screen (storage batteries only) in (B) of FIG. 29.

Figure 31:
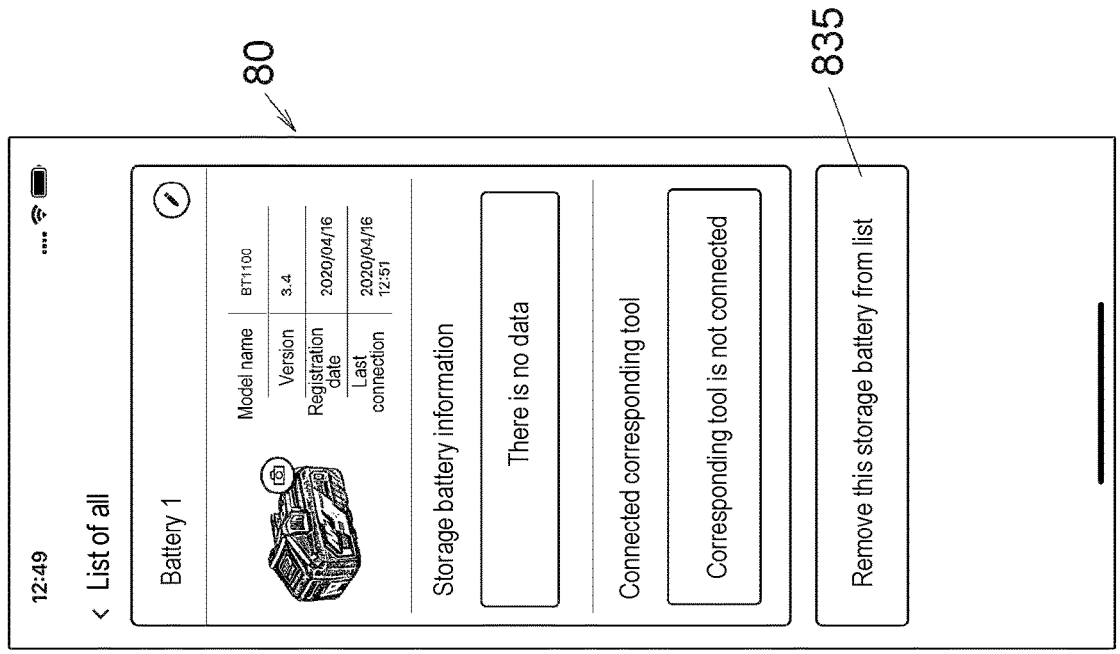
FIG. 31 also shows screens of the portable terminal 80, (A) of FIG. 31 is a tool information display screen (unconnected) allowing editing (customize or remove from the list) for a specific selected tool, and (B) of FIG. 31 is a storage battery information display screen (unconnected) allowing editing (remove from the list) for a specific selected storage battery.
Figure 31:
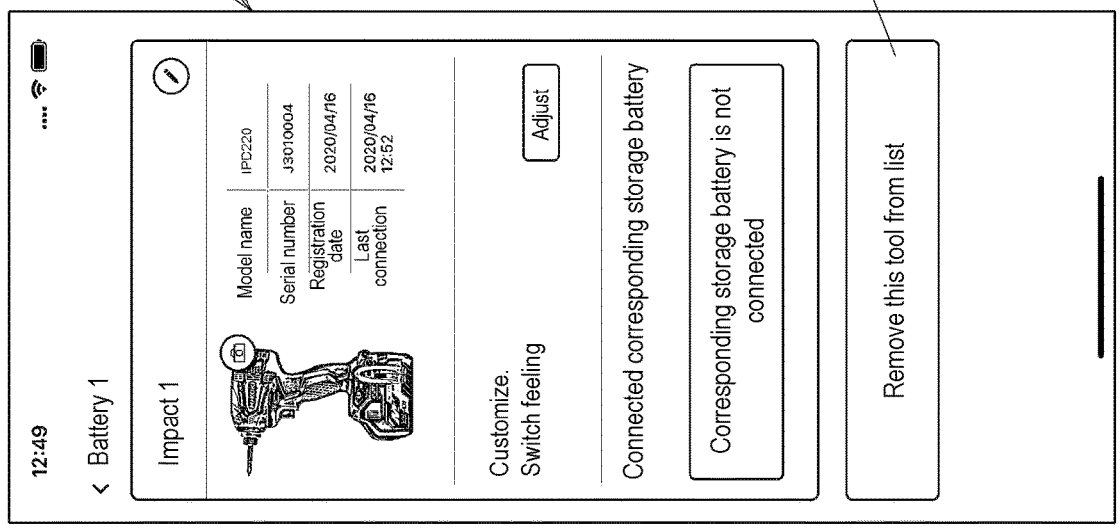

On the registration list screen (registered and unconnected) in (B) of FIG. 28, by tapping a right end part 824 of the listed tool name, the screen transitions to a tool information display screen (unconnected) in (A) of FIG. 31. By tapping a right end part 825 of the listed storage battery name, the screen transitions to a storage battery information display screen (unconnected) in (B) of FIG. 31.

Figure 29:
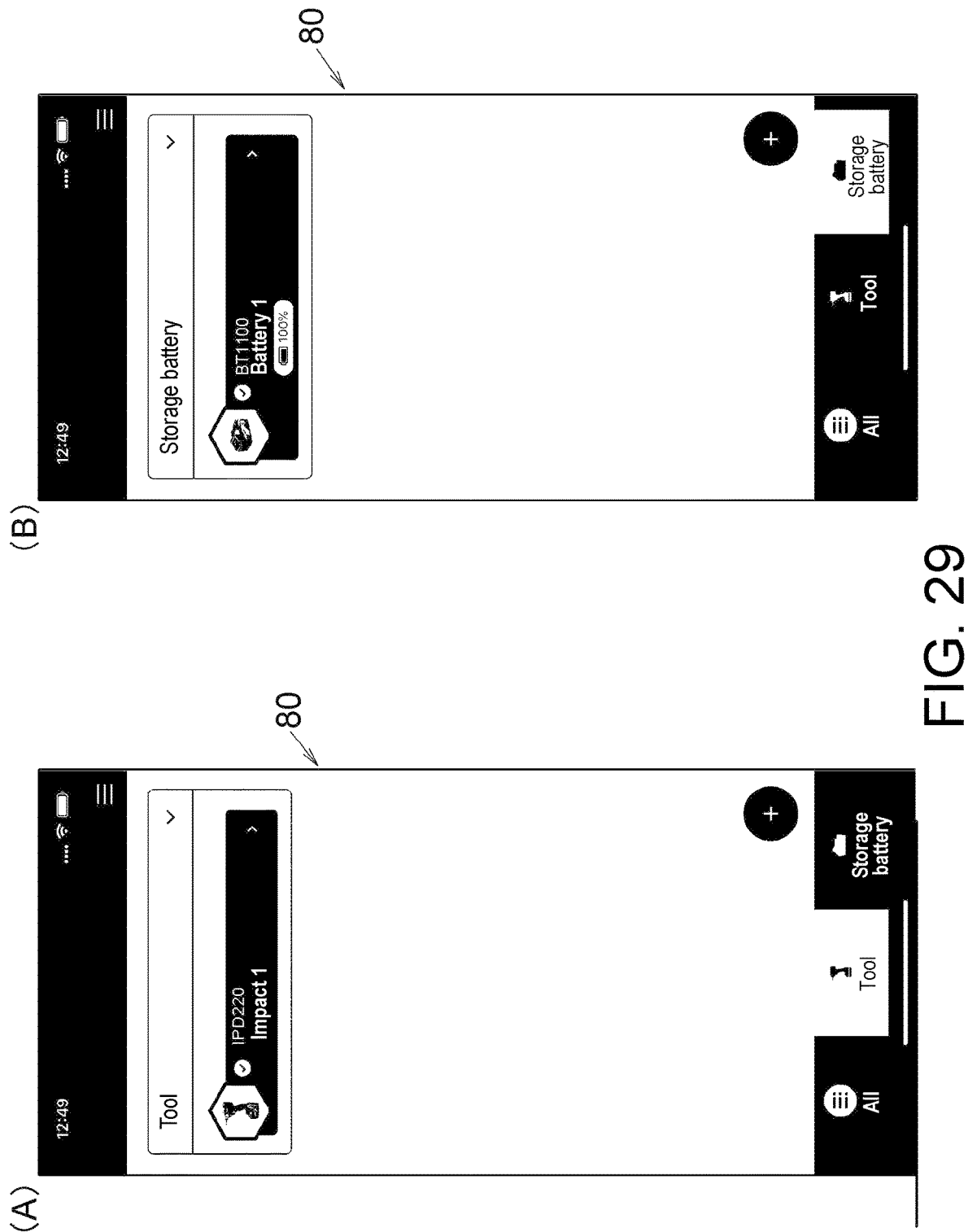
FIG. 29 also shows screens of the portable terminal 80, (A) of FIG. 29 is a tool list screen (tools only) displaying selectable tools, and (B) of FIG. 29 is a tool list screen (storage batteries only) displaying selectable storage batteries.

(A) of FIG. 29 is a tool list screen (tools only) displaying selectable tools, and (B) of FIG. 29 is a tool list screen (storage batteries only) displaying selectable storage batteries. These are screens for tools and storage batteries divided from the registered tool list function in (A) of FIG. 28, and the functions are the same.

Figure 30:
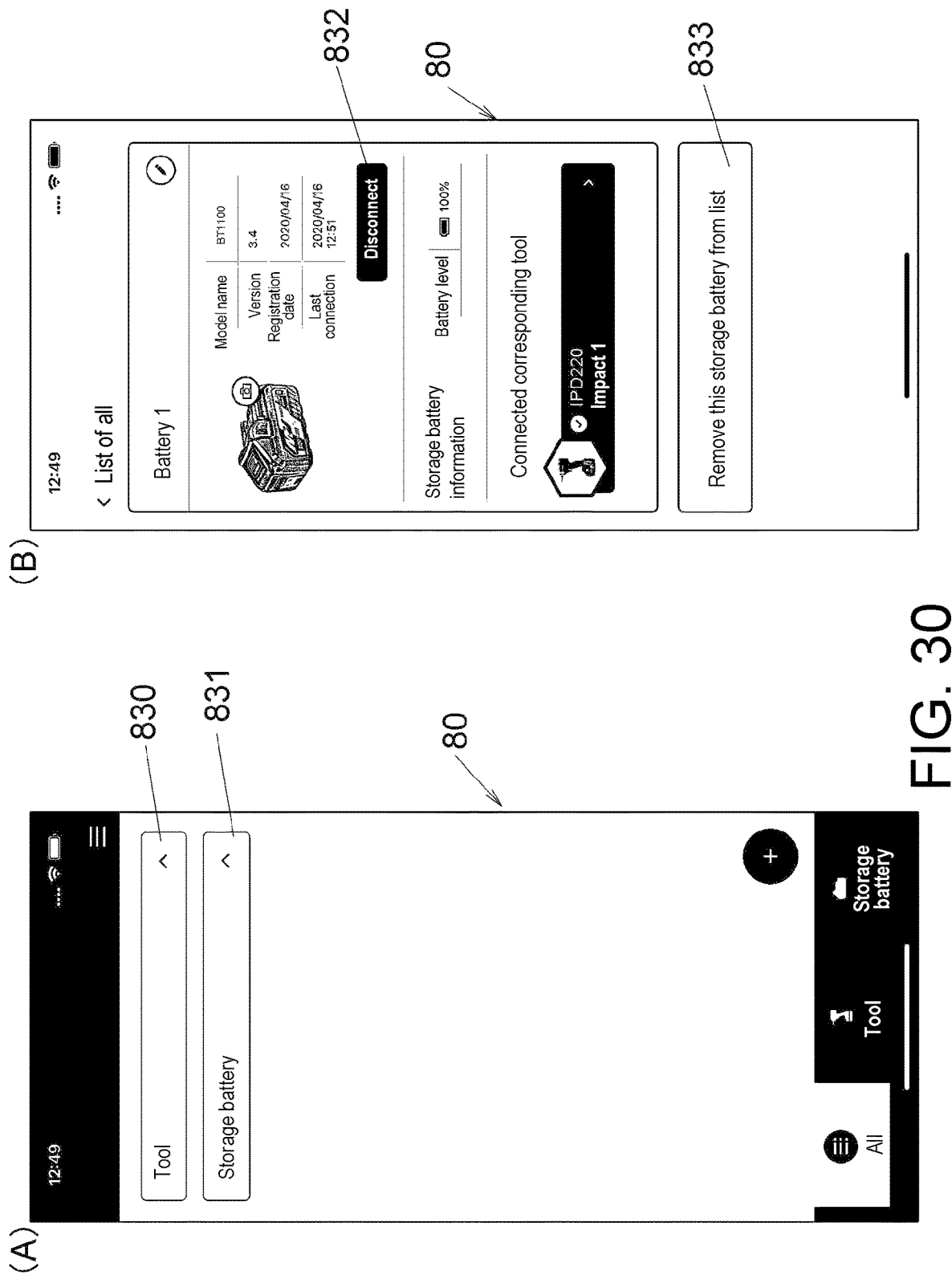
FIG. 30 also shows screens of the portable terminal 80, (A) of FIG. 30 is a tool list screen (folded) on which tools and storage batteries registered in the list may be searched, and (B) of FIG. is a storage battery information display screen which displays specific selected tool and storage battery and allows editing (disconnect or remove from the list) of the storage battery.

(A) of FIG. 30 is a tool list screen (folded) for searching in a registered tool list, and by tapping a tool display right end part 830, a tool list may be displayed. Similarly, by tapping a storage battery display right end part 831, a storage battery list may be displayed.

(B) of FIG. 30 is a battery information display screen (registered and tool connected) which displays specific selected tool and storage battery and allows editing (disconnect or remove from the list) of the storage battery. By tapping a "Disconnect" button 832, the displayed storage battery is disconnected. Further, by tapping a button 833 "Remove this storage battery from list", the displayed storage battery is removed from the list.

(A) of FIG. 31 is a tool information display screen (unconnected) when editing (remove from the list) for a specific selected tool, and (B) of FIG. 31 is a storage battery information display screen (unconnected) when editing (remove from the list) for a specific selected storage battery. In (A) of FIG. 31, by tapping a button 834 "Remove this tool from list", the displayed tool is removed from the list. In (B) of FIG. 31, by tapping a button 835 "Remove this storage battery from list", the displayed storage battery is removed from the list.

Figure 32:
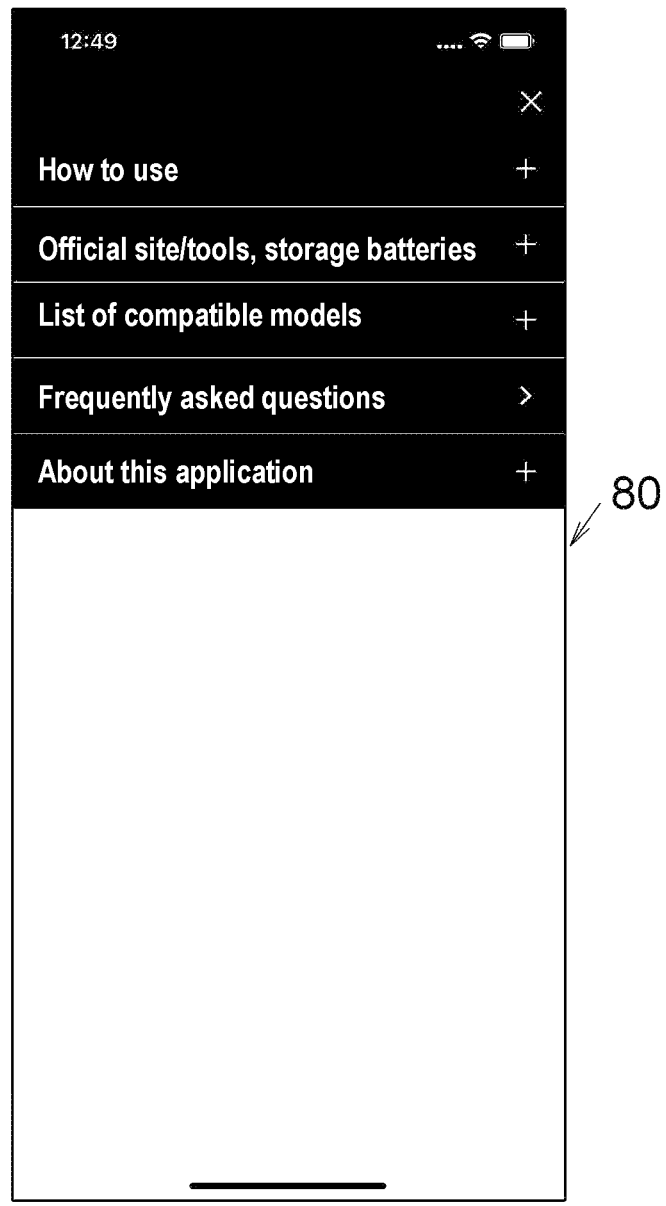
FIG. 32 is a menu screen which displays how to use the management application installed in the portable terminal 80, etc.

FIG. 32 is a menu screen which displays how to use the management application installed in the portable terminal 80, etc.

In (A) and (B) of FIG. 21 to FIG. 32, although screens such as a graph showing the relationship between the trigger pull amount and the rotational speed set on the feeling adjustment screen in (B) of FIG. 25 are not shown, the management application may have a function of displaying those screens.

Figure 33:
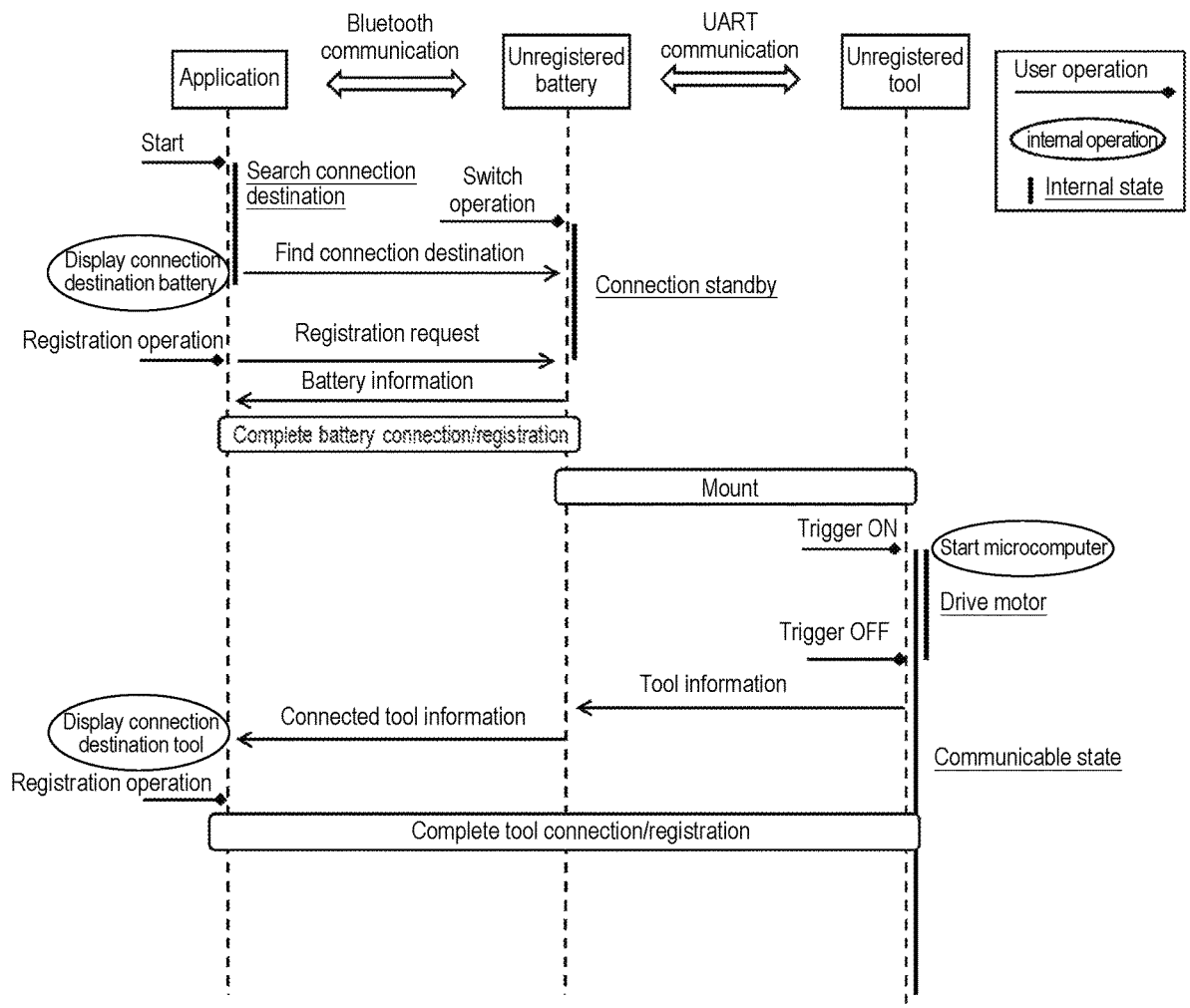
FIG. 33 is a view illustrating a flow until completion of connection/registration of unregistered electrical equipment 1 (denoted as "tool") and an unregistered battery pack 20 (denoted as "battery") using the management application.

FIG. 33 is a view illustrating a flow until completion of connection/registration of the electrical equipment 1 (denoted as "tool") and the battery pack 20 (denoted as "battery") registered using the management application (denoted as "application") installed in the portable terminal 80. The communication between the management application, that is, the portable terminal 80, and an unregistered battery is performed by Bluetooth (registered trademark) communication, which is a standard for short-range wireless communication, and the communication between an unregistered battery and an unregistered tool is performed by wired communication (UART communication) after the battery is mounted to the tool.

First, the management application is started, a connection destination is searched, and with a switch operation of an unregistered battery (operation of the operation button 27a), the battery side enters a connection standby state. When the application finds a connection destination, a connection destination battery is displayed on the screen of the application (see (B) of FIG. 21). By an application registration operation, a registration request is sent from the application to the unregistered battery in the connection standby state. Battery information is sent from the battery side to the application. As a result, connection and registration between the application and the battery are completed (see (A) of FIG. 22 to (B) of FIG. 23). Then, the battery is mounted to a tool, and they enter a state capable of wired communication with each other. The trigger switch 9 (denoted as "trigger") of the tool is operated (ON) to enable communication and start the microcomputer (arithmetic part 40) serving as the control part, and the motor is driven in a period until the trigger operation is stopped (OFF). Afterwards, tool information is sent to the battery, connected tool information is further sent from the battery to the application, and the connection destination tool is displayed on the application screen (see (A) of FIG. 24 to (A) of FIG. 25). By performing a registration operation on the application side, the connection and registration between the application and the tool are completed. The tool information is stored in the storage part 46 of the tool (electrical equipment main body 1), and this information is sent to the portable terminal 80 via the battery pack 20 and is stored in the storage part 82. At this time, the tool information is not stored in the storage part 23 of the battery pack 20, but the battery pack 20 merely relays the information. Similarly, the information of operation parameters sent to the tool from the portable terminal 80 (to be described later) is not stored in the storage part 23 of the battery pack 20, and the battery pack 20 functions as a repeater.

Figure 34:
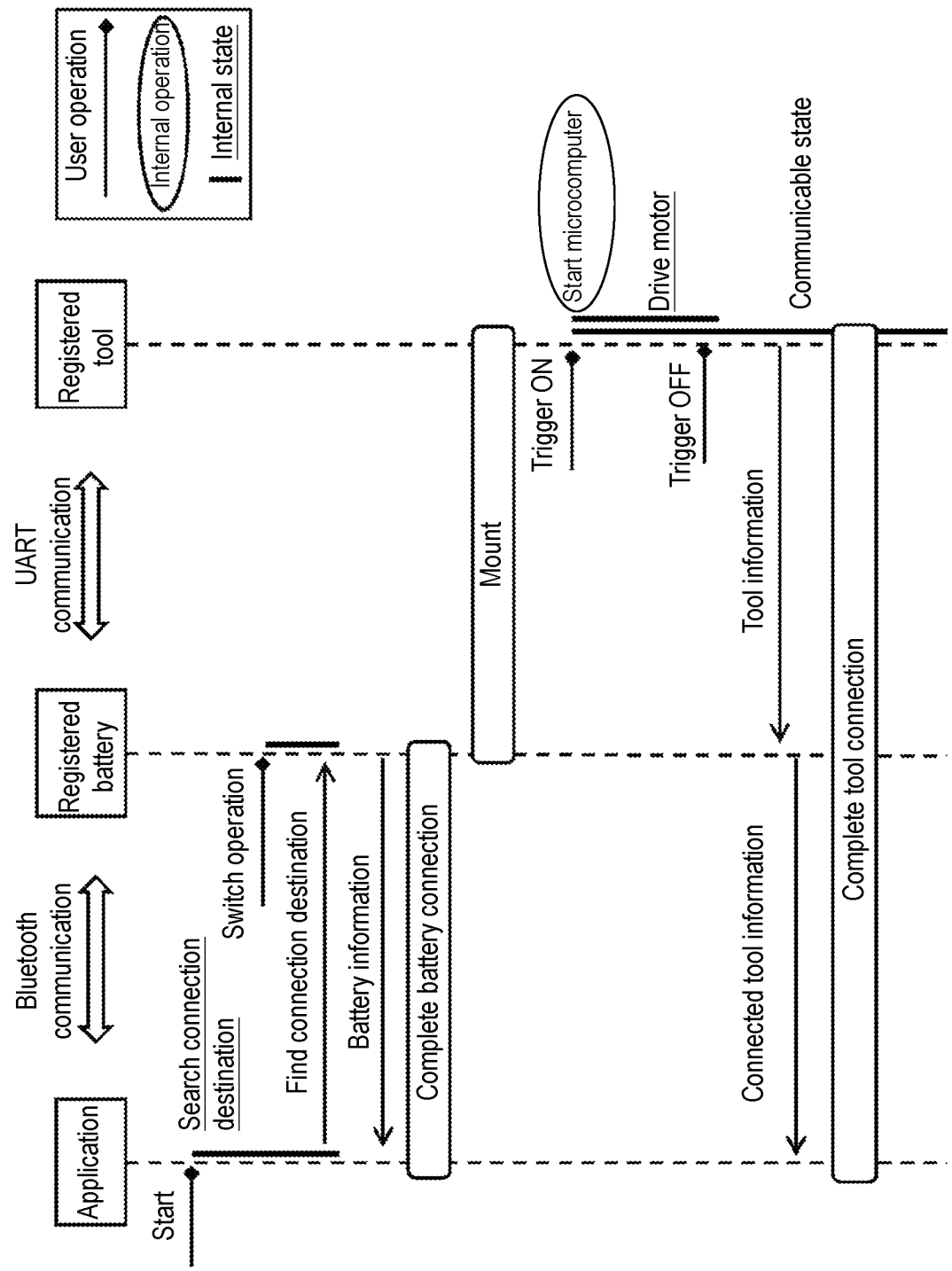
FIG. 34 is a view illustrating a flow until completion of connection/registration of a registered tool and a registered battery using the management application.

FIG. 34 is a view illustrating a flow until completion of connection/registration of a registered tool and a registered battery using the management application. Although the procedure is similar to that of FIG. 33, the steps of battery registration and tool registration are not required.

Figure 35:
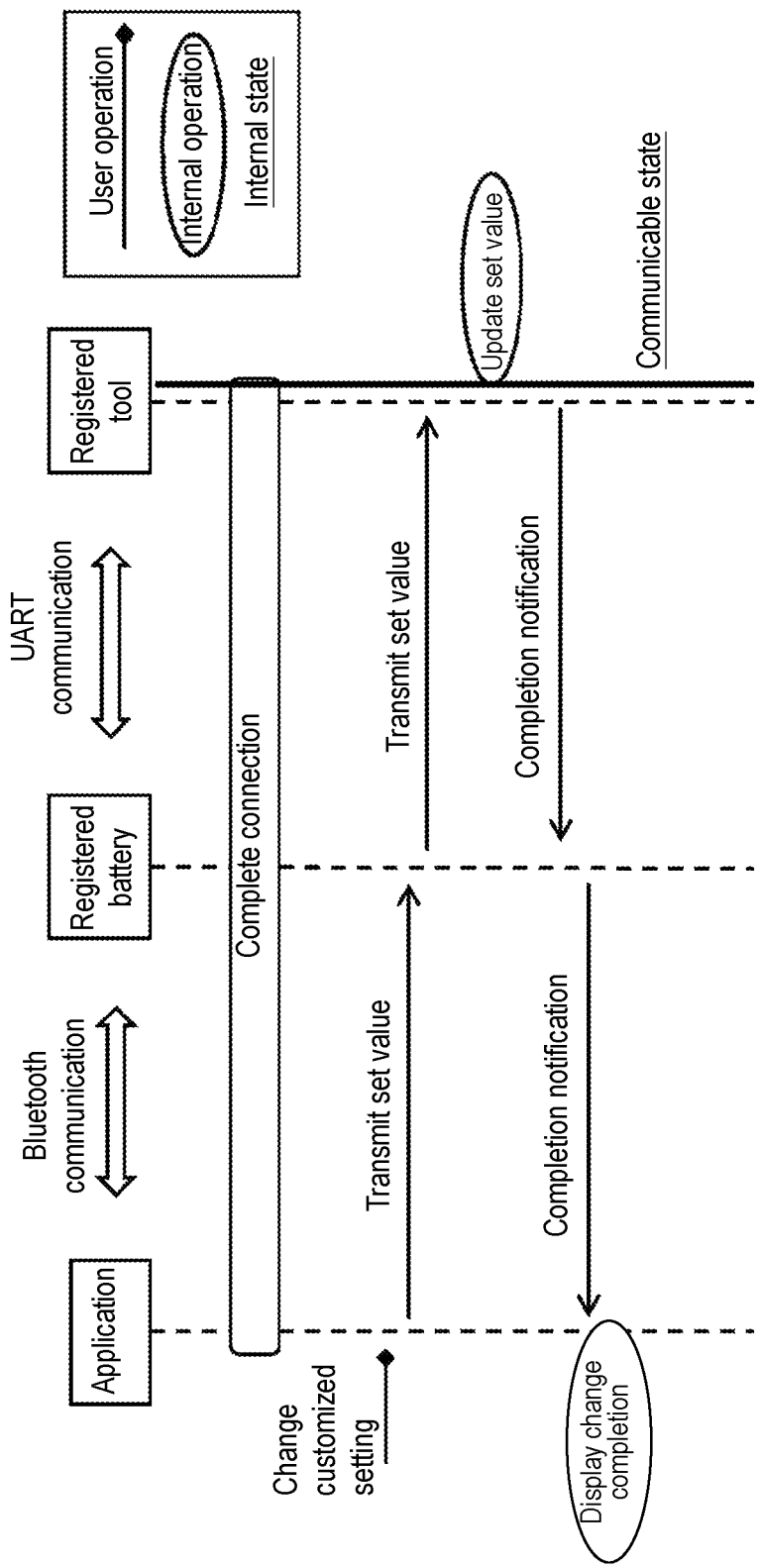
FIG. 35 is a view illustrating a flow from connection completion of a registered tool and a registered battery until completion of subsequent customized setting change using the management application.

FIG. 35 is a view illustrating a flow from connection completion of a registered tool and a registered battery until completion of subsequent customized setting change using the management application. The communication between the management application, that is, the portable terminal 80, and the registered battery is performed by Bluetooth (registered trademark) communication, which is a standard for short-range wireless communication, and the communication between the registered battery and the registered tool is performed by wired communication (UART communication).

After connection is completed between the registered battery and the registered tool by the management application, a customized setting change is performed from the application screen in (B) of FIG. 25. Accordingly, the customized set values are transmitted to the registered tool via the registered battery. The registered tool enters a communicable state, performs a set value change inside the tool, stores the set value to the storage part 46, transmits a completion notification to the registered battery, and the completion notification is further transmitted from the registered battery to the application. A change completion notification is displayed on the application screen (see (A) and (B) of FIG. 26).

Figure 36:
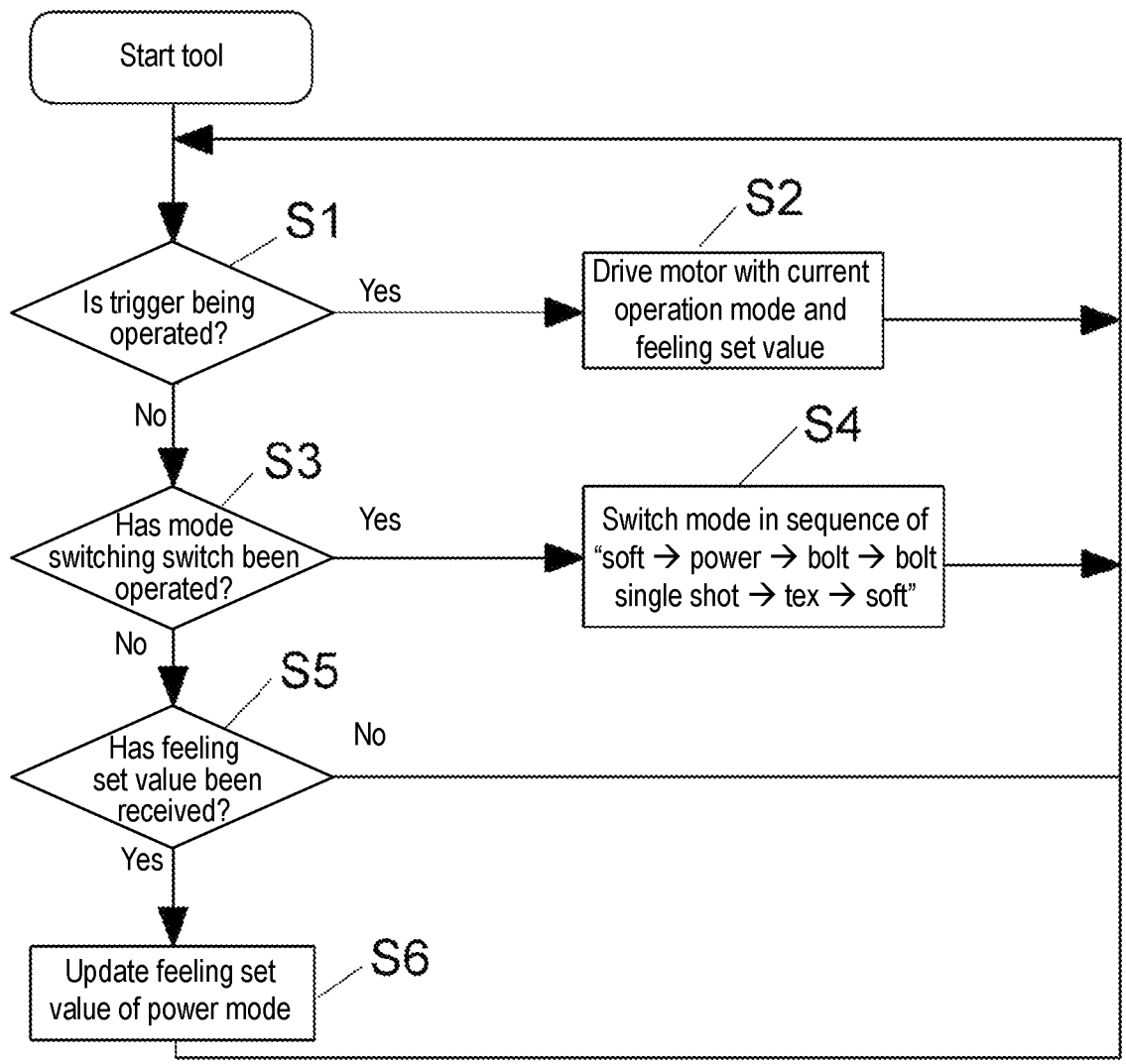
FIG. 36 is a flowchart at the time of customizing the feeling of the tool.

FIG. 36 is a flowchart at the time of customizing the feeling of the tool. In this figure, after starting the tool, in step S1, it is determined whether the trigger 9 is being operated. If "Yes", in step S2, the motor is driven with the current operation mode and feeling set value, and the process returns to step S1. In other words, customization cannot be performed while the trigger 9 is being operated. If the determination in step S1 is "No", in step S3, it is determined whether the mode switching switch (the operation part 11b of the mode switching part 11) has been operated. If the determination in step S3 is "Yes", in step S4, the operation mode is switched in the sequence of "soft-→power→bolt→bolt single shot→tex→soft", and the process returns to step S1.

If the determination in step S3 is "No", in step S5, it is determined whether a feeling set value has been received. If the determination in step S5 is "Yes", in step S6, the feeling set value of the power mode is updated, and the process returns to step S1. If the determination in step S5 is "No", the process returns to step S1.

Figure 37:
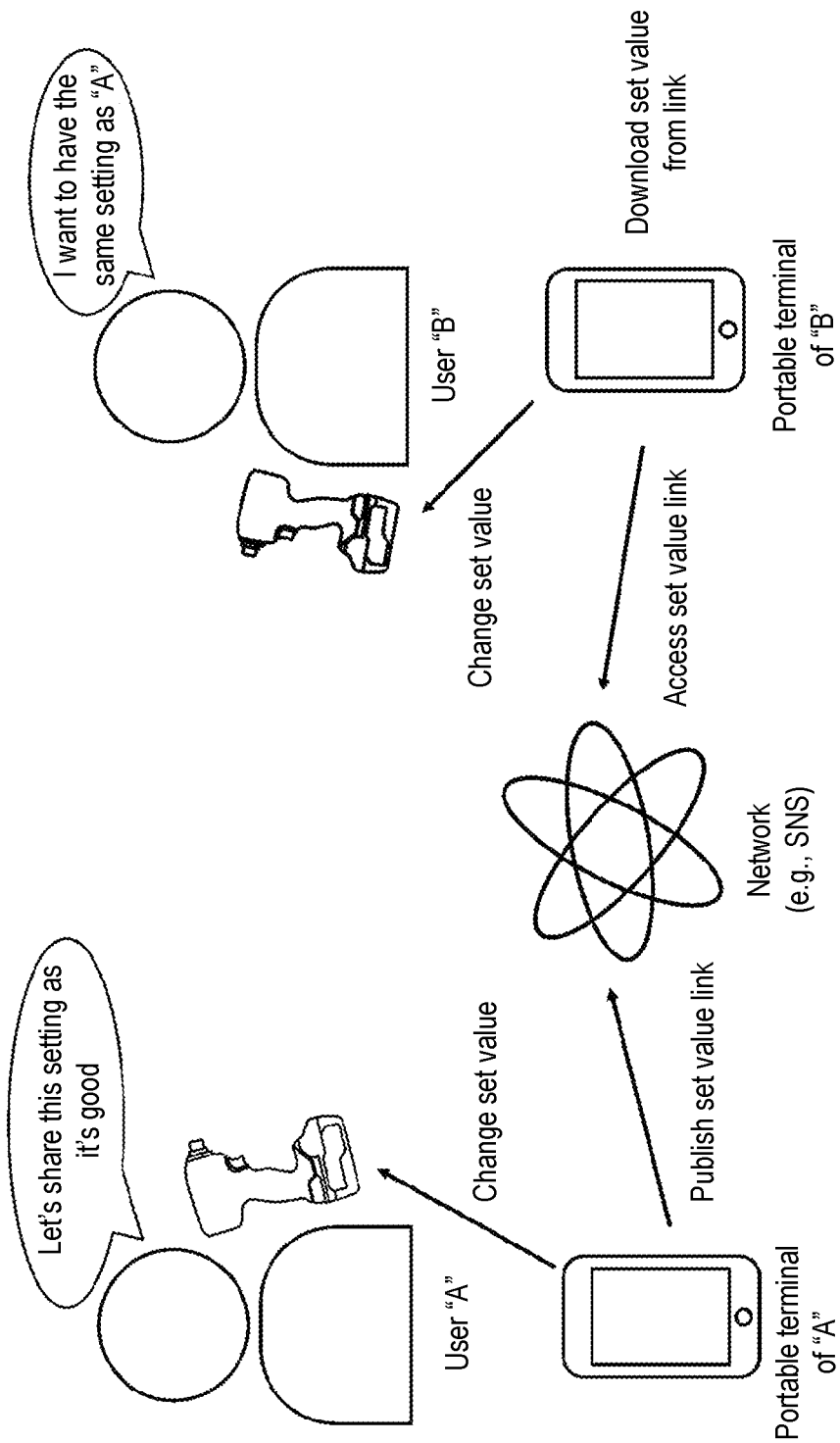
FIG. 37 is a view illustrating a case of sharing set values customizing a tool feeling.

FIG. 37 is a view illustrating a case of sharing set values customizing a tool feeling. After a user "A" changes the set value of the tool of "A" from the portable terminal of "A", when allowing sharing or recommending set values to another user, a link of set values is uploaded to a network such as an SNS and published. A user "B", who wants the same setting as "A", may access the link to the set values from the portable terminal of "B", download the set values from the link, and change the set values of the tool of the user "B".

In the case of users who work at the same work site, sharing set values that customize feeling may save time and effort for customization. In addition, by sharing the set values at the same work site, work can be performed under the same conditions, so that work unevenness among users can be suppressed.

Figure 38:
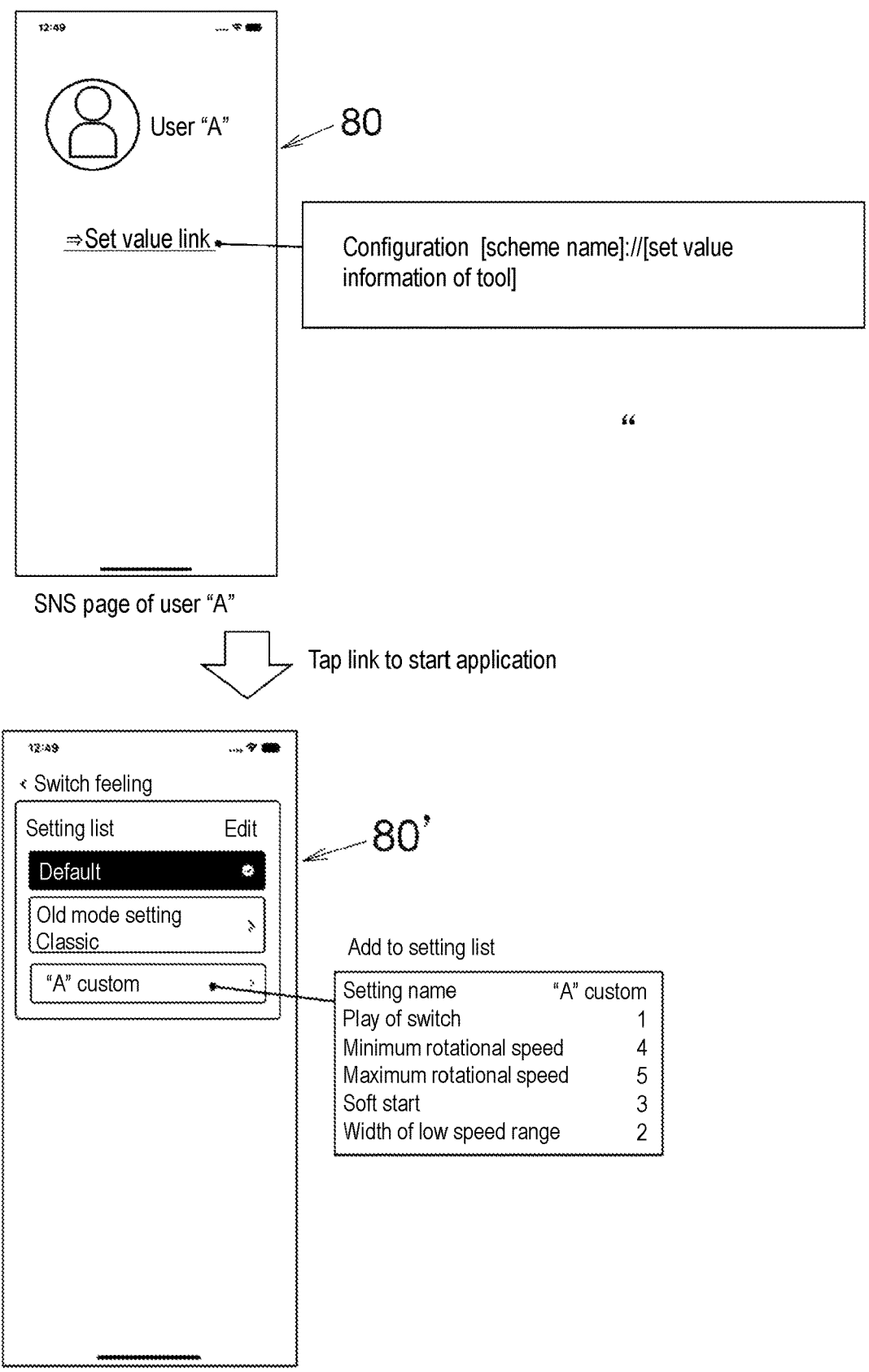
FIG. 38 is a view including a display screen of the portable terminal 80 in a case of sharing the set values.

FIG. 38 is a view including a display screen of the portable terminal 80 in a case of sharing set values customized for tool feeling. By tapping a set value link on an SNS page of the user "A" on a portable terminal 80' other than the user "A", the application can be started and the setting list can be added.

According to the embodiments, the following effects can be obtained.

(1) Since the operational feeling of the electrical equipment 1 may be widely customized without being restricted by the operation parameters prepared in advance for the electrical equipment 1, it is possible to provide the electrical equipment 1 that is easy to use for more users than before and has an optimum or appropriate operational feeling.

(2) Optimum or appropriate operation parameters that match the user or the work content may be transmitted from the external portable terminal 80 to the electrical equipment 1 to which the battery pack 20 is mounted via the battery pack 20 with a wireless communication function. Therefore, the main body of the electrical equipment 1 itself does not require a wireless communication function. Further, once the operation parameters are stored in the electrical equipment, even if a battery pack that does not have a wireless communication function is connected, the electrical equipment 1 can be driven with the stored operation parameters, so workability is improved.

(3) In the case of changing the set rotational speed (i.e., transmission characteristics) of the drive part (motor 3) corresponding to the operation (pull amount) of the trigger switch 9 serving as the operation part, for example, since it is possible to set a speed range necessary according to the work content, such as enlarging a speed range to be fine-tuned, workability is improved.

(4) The set rotational speed of the motor corresponding to the operation of the trigger switch 9 after the motor has started and the time (degree of soft start) taken for the motor to reach the maximum rotational speed when the pull amount of the trigger switch is at its maximum can be set to the optimum or more appropriate set values that match the user or the work content, and operation parameters can be set to match the type of screw to improve workability without damaging the screw.

(5) Setting completion after changing the operation parameter may be displayed as a change in the color or blinking of the equipment-side display part (mode switching part 11) of the electrical equipment 1, and the user can recognize change completion of the operation parameter.

(6) In the case where the electrical equipment 1 is a tool such as an impact driver, for example, the following operation parameters are changeable. a. Set value of trigger switch pull amount (amount of play) at which tool starts rotating: Since a starting position (so-called amount of play) of the motor according to the trigger switch 9 can be changed according to the size of the user's hand or preference, the user can use the equipment easily and workability is improved. For example, if the user's hand is small, the amount of play is increased, and if the user's hand is large, the amount of play is decreased, so that the operational feeling can be improved (unified). b. Set value of minimum rotational speed: Since the minimum rotational speed may be changed, it can be set according to the type of screws used, so workability is improved. For example, it is possible to perform stripped screw prevention and screw tapping settings. A low minimum rotational speed is suitable for delicate works that require low speed, such as tightening short screws. c. Set value of trigger switch pull amount at which rotational speed is at its maximum: By changing the setting of the trigger switch pull amount at which the rotational speed of the trigger switch 9 is at its maximum according to the size of the user's hand or preference, it is possible to adapt to the size of the user's hand or preference, and workability is improved. d. Set value of maximum rotational speed: If the user is accustomed to handling the tool and wants to work quickly, a setting with a high maximum rotational speed is suitable, and if the user is not accustomed to handling the tool, a setting with a low maximum rotational speed is suitable, so there is an advantage that the maximum rotation may be set according to the user's proficiency. e. Set value which determines characteristics connecting trigger switch pull amount and rotational speed characteristics determined by a to d (set degree of curve of rotational speed change corresponding to trigger switch pull amount, and pull amount and rotational speed of inflection point): If the transmission characteristics are changeable, for example, since it is possible to set a wide speed range necessary according to the work content, such as enlarging a speed range to be fine-tuned, workability can be improved. At the same time, by making it possible to change the amount of play of the trigger, the minimum rotational speed, the maximum rotational speed, and the trigger switch pull amount at which the rotational speed is at its maximum, various settings can be performed according to the user's requirements. f. Set value (rotational speed increase rate) which determines time taken for rotational speed of motor to reach set rotational speed after trigger switch is operated: If the user is accustomed to handling the tool and wants to work quickly, a setting with a high rotational speed increase rate is suitable; if one does not care about work speed but wants to suppress cam-out, a setting with a low rotational speed increase rate is suitable, so the rotational speed increase rate may be set according to the user's proficiency. Items a to e may be combined and changed at the same time.

Although the present invention has been described above with reference to the embodiments, it should be understood by those skilled in the art that various modifications may be made to each component and each processing process of the embodiments within the scope of the claims. A modification example will be discussed below.

Although the configuration of an impact driver in FIG. 2 has been illustrated in the embodiments of the present invention, in addition to electrical tools such as hammer drills, driver drills, and circular saws, the present invention may also be applied to electrical equipment that performs control to change a rotational speed of a drive part such as a motor based on an operation amount of an operation part.

What is claimed is:
1. An electrical equipment comprising:
a drive part;
a control part which controls the drive part;
an operation part which instructs start and stop of the drive part; and
a storage part which stores operation parameters for driving the drive part, wherein the operation parameters comprise:
an operation amount of the operation part for starting the drive part from a stopped state; and
a set rotational speed of the drive part corresponding to an operation of the operation part after the drive part has started or a minimum rotational speed of the drive part,
the operation amount and the set rotational speed or the minimum rotational speed are configured to be changeable, and
a pull amount of the operation part until the drive part reaches a maximum rotational speed is configured not to be changed even if the operation amount is changed.

2. The electrical equipment according to claim 1, wherein all of the operation amount, the set rotational speed, and the minimum rotational speed are configured to be changeable.

3. The electrical equipment according to claim 1, wherein an acceleration characteristic from when a pull amount of the operation part exceeds the operation amount until the drive part reaches the maximum rotational speed is configured to be automatically changed.

4. An electrical equipment system comprising:
the electrical equipment according to claim 1; and
an external device communicable with the electrical equipment,
wherein the operation parameters are configured to be changeable by the external device,
the electrical equipment comprises an equipment-side communication part for communicating with the external device, and
the external device comprises: an input part which inputs the operation parameters; a display part which displays the operation parameters; and an external device-side communication part for communicating with the equipment-side communication part.

5. The electrical equipment system according to claim 4, wherein
the display part is capable of displaying an image showing the electrical equipment, and the image is changeable.

6. An electrical equipment comprising:
a drive part;
a control part which controls the drive part;
an operation part which instructs start and stop of the drive part; and
a storage part which stores operation parameters for driving the drive part,
wherein the rotational speed of the drive part is configured to change according to an operation amount of the operation part,
wherein the operation parameters comprise:
a transmission characteristic as a curve of the rotational speed of the drive part corresponding to an operation amount of the operation part after the drive part has started; and
a set value of a soft start that changes a time taken for the drive part to reach a maximum rotational speed from a first state where the operation part is not operated and the drive part is not rotating when an operation amount of the operation part is operated to the maximum amount at the same speed, and
the transmission characteristic and the set value of the soft start are configured to be changeable in five levels by an external device communicable with the electrical equipment.

7. The electrical equipment according to claim 6,
wherein the operation parameters comprise a minimum rotational speed for the drive part to start rotating, and
wherein the first operation amount is configured to be changeable by communication with the external device when the minimum rotational speed and the maximum rotational speed are constant.

8. The electrical equipment according to claim 6,
wherein the operation parameters comprise a minimum rotational speed for the drive part to start rotating, and
wherein at least one of the maximum rotational speed and the minimum rotational speed is configured to be changeable by communication with the external device.

9. The electrical equipment according to claim 6,
wherein the operation parameters comprise a first operation amount that is an operation amount of the operation part required for the drive to reach the maximum rotational speed from the first state, and
wherein the first operation amount is configured to be changeable by communication with the external device.

10. The electrical equipment according to claim 9,
wherein the operation parameters comprise a minimum rotational speed for the drive part to start rotating and the maximum rotational speed, and
wherein at least one of the maximum rotational speed and the minimum rotational speed is configured to be changeable by communication with the external device.

11. An electrical equipment system comprising:
the electrical equipment according to claim 6; and
an external device communicable with the electrical equipment,
wherein the operation parameters are configured to be changeable by the external device,
the electrical equipment comprises an equipment-side communication part for communicating with the external device, and
the external device comprises: an input part which inputs the operation parameters; a display part which displays the operation parameters; and an external device-side communication part for communicating with the equipment-side communication part.

12. The electrical equipment system according to claim 11,
wherein the external device is installed a management application for changing the operation parameters,
wherein the input part comprises:
a customize button which changes the display part to a screen for changing the operation parameters;
a slider which changes the operation parameter; and
a registration button which registers the operation parameters,
wherein the operation parameters are configured to be changeable in a plurality of levels by changing the position of the slider.

13. An electrical equipment comprising:
a drive part;
a control part which controls the drive part;
an operation part which instructs start and stop of the drive part; and
a storage part which stores at least one operation parameter for driving the drive part,
wherein the rotational speed of the drive part is configured to change according to an operation amount of the operation part,
wherein the operation parameter comprises:
a first operation amount of the operation part at which the drive part becomes a maximum rotational speed from a state where the operation part is not operated and the drive part is not rotating; and the maximum rotational speed, and wherein the first operation amount when the maximum rotational speed is constant is configured to be changeable in three or more levels by an external device communicable with the electrical equipment.

14. The electrical equipment according to claim 13, wherein the operation parameters comprise a minimum rotational speed for the drive part to start rotating, and wherein the first operation amount is configured to be changeable by communication with the external device when the minimum rotational speed and the maximum rotational speed are constant.

15. The electrical equipment according to claim 13, wherein the operation parameters comprise a minimum rotational speed for the drive part to start rotating, and wherein at least one of the maximum rotational speed and the minimum rotational speed is configured to be changeable by communication with the external device.

16. The electrical equipment according to claim 13, wherein the operation parameters comprise a transmission characteristic as a curve of the rotational speed of the drive part corresponding to an operation amount of the operation part after the drive part has started; and wherein the transmission characteristic is configured to be changeable by communication with the external device.

17. The electrical equipment according to claim 13, wherein the operation parameters comprise a set value of a soft start that changes a time taken for the drive part to reach a maximum rotational speed from a state where the operation part is not operated and the drive part is not rotating when an operation amount of the operation part is operated to the maximum amount at the same speed, and wherein the set value of the soft start is configured to be changeable by communication with the external device.

18. An electrical equipment system comprising:

the electrical equipment according to claim 13; and an external device communicable with the electrical equipment, wherein the operation parameters are configured to be changeable by the external device, the electrical equipment comprises an equipment-side communication part for communicating with the external device, and the external device comprises: an input part which inputs the operation parameters; a display part which displays the operation parameters; and an external device-side communication part for communicating with the equipment-side communication part.

19. The electrical equipment system according to claim 18, wherein the external device is installed a management application for changing the operation parameters, wherein the input part comprises:

a customize button which changes the display part to a screen for changing the operation parameters a slider which changes the operating parameter; and a registration button which registers the operation parameters, wherein the operation parameters are configured to be changeable in a plurality of levels by changing the position of the slider.

* * * * *